(12) United States Patent
Drew

(10) Patent No.: US 9,358,688 B2
(45) Date of Patent: *Jun. 7, 2016

(54) MACHINE FOR ALIGNING ITEMS IN A PATTERN AND A METHOD OF USE

(71) Applicant: Gary Lee Drew, DePere, WI (US)

(72) Inventor: Gary Lee Drew, DePere, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/738,162

(22) Filed: Jun. 12, 2015

(65) Prior Publication Data

US 2015/0336272 A1    Nov. 26, 2015

Related U.S. Application Data

(63) Continuation-in-part of application No. 14/261,629, filed on Apr. 25, 2014, now Pat. No. 9,074,381.

(51) Int. Cl.
*E04B 1/00* (2006.01)
*B25J 9/16* (2006.01)
(Continued)

(52) U.S. Cl.
CPC .............. *B25J 9/1687* (2013.01); *B25J 5/007* (2013.01); *B25J 5/02* (2013.01); *B25J 9/0018* (2013.01);
(Continued)

(58) Field of Classification Search
CPC ........... E04G 21/22; B25J 5/00; B25J 9/1687; B25J 9/0018; B25J 19/021; B25J 13/089; B25J 15/0616; B25J 5/007; B25J 9/023; E04F 21/20; B32B 41/00; B32B 3/14; B32B 38/1858; B32B 37/1284; B32B 38/1808; B32B 37/0046
USPC .................. 52/747.11, 749.1, 749.14, 749.15
See application file for complete search history.

(56) References Cited

U.S. PATENT DOCUMENTS 2,835,175 A    5/1958  Frey
3,678,645 A    7/1972  Valdes
(Continued)

FOREIGN PATENT DOCUMENTS

CN    201714046    1/2011
CN    102277955    12/2011
(Continued)

OTHER PUBLICATIONS

Khaw Boon Wan, To save on construction costs, consider using robots—May 20, 2014, www.youtube.com video screen shots, https://www.youtube.com/watch?v=njlqxafip8E, published May 20, 2014, 26 pages, blogpost today(May 20), Singapore.

(Continued)

*Primary Examiner* — Basil Katcheves
(74) *Attorney, Agent, or Firm* — Thomas J. Connelly; Northwind IP Law, S.C.

(57) ABSTRACT

A machine for aligning items in a pattern and a method of using the machine. The machine includes a robotic assembly having four spaced apart joints. The joints including a base joint which is mounted to a stationary surface and a wrist joint onto which an effector is secured. A suction cup is mounted on the effector and is connected to a vacuum source. The suction cup is capable to picking up, positioning and releasing a new item relative to a first laid item and a second laid item. The first and second laid items each have an upper surface and each is aligned perpendicular to one another. The machine further includes three edge sensors and three height sensor. At least one of the edge and height sensors are secured to a first side of the effector and is capable of detecting an edge aligned along an X-X axis of the first laid item and the height of the upper surface of the first laid item, and at least one of the edge and height sensors are secured to a second side of the effector and is capable of detecting an edge aligned along a Y-Y axis of the second laid item and the height of the upper surface of the second laid item. The machine further includes a control mechanism for operating the robotic assembly, the vacuum source and the edge and height sensors. Lastly, the machine includes a power source for supplying power to the control mechanism.

20 Claims, 13 Drawing Sheets

(51) Int. Cl.

| | |
|---|---|
| *B25J 9/02* | (2006.01) |
| *B25J 5/00* | (2006.01) |
| *B25J 5/02* | (2006.01) |
| *B32B 37/00* | (2006.01) |
| *B32B 37/12* | (2006.01) |
| *B32B 37/18* | (2006.01) |
| *B32B 38/18* | (2006.01) |
| *B32B 41/00* | (2006.01) |
| *B32B 3/14* | (2006.01) |
| *B25J 9/00* | (2006.01) |
| *B25J 13/08* | (2006.01) |
| *B25J 15/06* | (2006.01) |
| *B25J 19/02* | (2006.01) |
| *E04F 21/20* | (2006.01) |
| *E04F 21/18* | (2006.01) |

(52) U.S. Cl.
CPC ............... *B25J 9/023* (2013.01); *B25J 13/089* (2013.01); *B25J 15/0616* (2013.01); *B25J 19/021* (2013.01); *B32B 3/14* (2013.01); *B32B 37/0046* (2013.01); *B32B 37/1284* (2013.01); *B32B 37/18* (2013.01); *B32B 38/1808* (2013.01); *B32B 38/1858* (2013.01); *B32B 41/00* (2013.01); *E04F 21/20* (2013.01); *B32B 2038/1891* (2013.01); *B32B 2309/72* (2013.01); *E04F 21/18* (2013.01); *Y10S 901/01* (2013.01); *Y10S 901/02* (2013.01)

(56) References Cited

U.S. PATENT DOCUMENTS

| | | | |
|---|---|---|---|
| 4,583,879 | A | 4/1986 | Hofman |
| 4,827,689 | A | 5/1989 | Lonardi et al. |
| 5,018,923 | A | 5/1991 | Melan et al. |
| 5,284,000 | A | 2/1994 | Milne et al. |
| 5,516,254 | A | 5/1996 | Gessler |
| 5,863,169 | A | 1/1999 | Inkeroinen |
| 8,166,727 | B2 | 5/2012 | Pivac et al. |
| 2003/0172511 | A1 | 9/2003 | Thompson |

FOREIGN PATENT DOCUMENTS

| | | |
|---|---|---|
| EP | 2157259 | 2/2010 |
| JP | 4302660 | 10/1992 |
| NL | 1037930 | 11/2011 |
| WO | 2007102731 | 9/2007 |
| WO | 2011144003 | 11/2011 |

OTHER PUBLICATIONS

Buttazzo G et al, "Robotic tile placement through adaptive control strategies", Advanced Robotics, Fifth International Conference on Pisa, Italy, published Jun. 19, 1991, pp. 379-384 vol. 1, New York, NY, USA.

Apostolopoulos D et al, "Mobile robot for automatic installation of floor tiles," Robotics and Automation, Proceedings, 1996 IEEE International Conference on Minneapolis, MN , USA, Apr. 22, 1996, vol. 4, p. 3652-3657, New York, NY, USA.

Jos Lichtenberg, "The Development of a Robot for Paving Floors with Ceramic Tiles," retrieved from the internet, http://www.irbnet.de/daten/iconda/CIB13500.pdf, Jan. 1, 2003, p. 1, col. 2.

J P R Jongeneel et al, "Robotic tiling of rough floors: A design study," retrieved from the internet, http:// www.mate.tue.nl/mate/pdfs/12170.pdf, Dec. 20, 2010, figures 3 and 4.

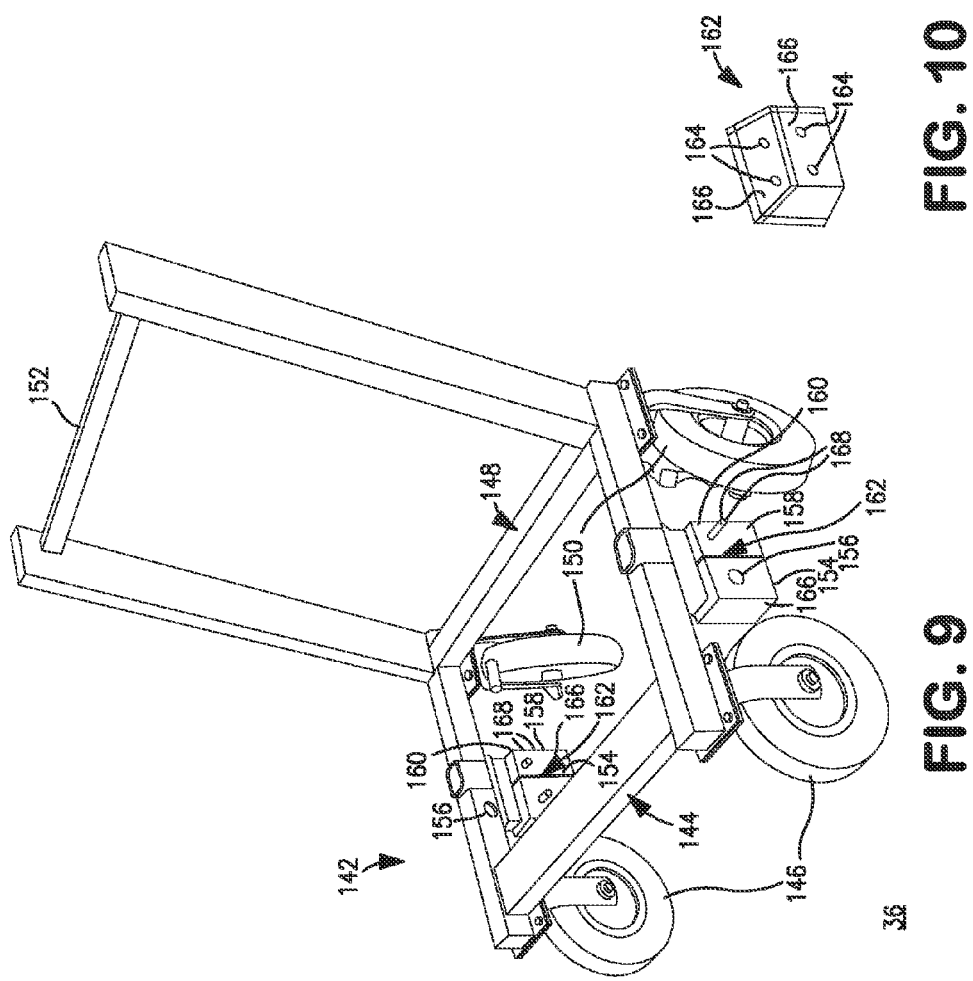

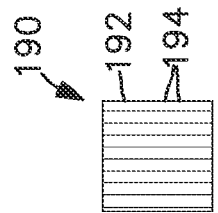
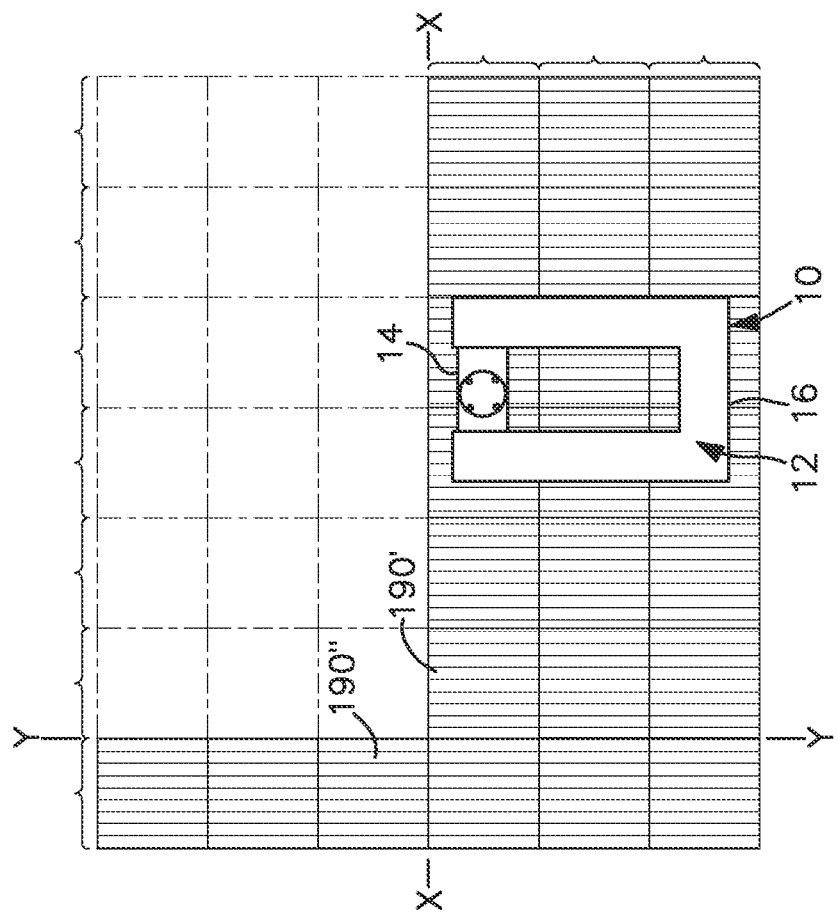

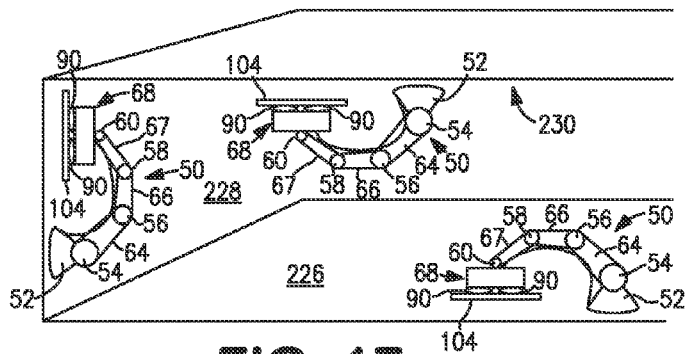
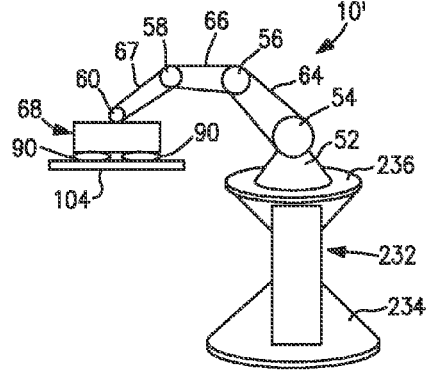
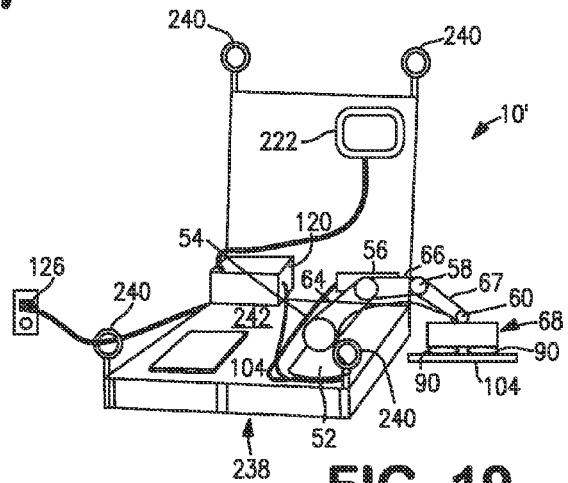
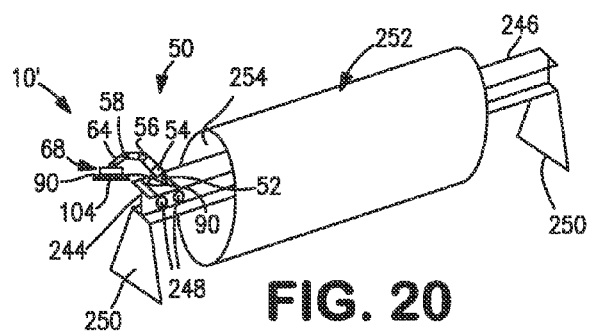

MACHINE FOR ALIGNING ITEMS IN A PATTERN AND A METHOD OF USE

CROSS REFERENCE TO RELATED APPLICATION

This application is a Continuation-In-Part of U.S. Ser. No. 14/261,629 entitled "A TILE LAYING MACHINE AND A METHOD OF USE" filed Apr. 25, 2014.

FIELD OF THE INVENTION

This invention relates to a machine for aligning items in a pattern and a method of use.

BACKGROUND OF THE INVENTION

Various kinds of items from electronic components to tile can be aligned in a pattern to construct various articles useful in the home or in a retail or industrial environment. One such item is tiles. Tiles can be produced by baking clay. A ceramic tile is a very common tile used for floors and bathroom walls. Other kinds of tiles include but are not limited to: vinyl tiles, plastic tiles, stone tiles, bricks, roof shingles, roof panels, wall panels, wall siding, tiles composed of two or more different materials, etc. The individual tiles can vary in size, shape, weight, geometrical form, thickness, composition, etc. The individual tiles can be plain in appearance or contain a unique texture, pattern or surface geometry. It is also possible to paint or decorate individual tiles, if desired. Many tiles are square in shape and can vary in dimensions from a 1 inch square up to about 16 inch squares. For some retail and industrial applications, the tiles can be larger, say having 20 inch squares or even 24 inch squares. Rectangular shape tile are also prevalent and can vary in dimensions. For example, a rectangular tile used in a residential bathroom could be 6 inches by 10 inches. Tiles having other geometrical shape are not as common but do exist. For example, a triangular shaped tile can be used to form a decorative border.

Tiles are usually installed manually, one at a time, by a skilled craftsman, such as a mason. The underlying surface can vary but is usually a concrete floor for retail and industrial buildings, and some type of composite board, green board, etc. positioned over plywood in residential construction. Usually, the underlying surface is poured or constructed so as to be essentially flat and planar. Alternatively, especially in forming the floor of a bathroom shower, the underlying surface is tapered so that water from the shower head will flow down and toward a floor drain. The underlying surface is then covered or treated with a bonding material which will allow each tile to securely bond to the underlying surface. For example, the underlying surface can have an adhesive, glue, cement, mortar, etc. applied to it. This bonding material is usually applied evenly so as to completely cover the underlying surface. This bonding material is also applied manually.

In addition to tiles, a variety of other items can be assembled to construct computer boards, art work, panels, decorative panels for lining interior or exterior surfaces, sub-assemblies, electrical harnesses, etc.

It has been recognized that a machine capable of aligning items in a pattern could shorten the time and reduce the cost to construct the assembly or to install panels, such as a tile floor. A machine capable of aligning items would be very useful in a number of different applications including but not limited to: installing a tile floor in a large box store that is being constructed, in a large hotel lobby, in the foyer of a convention center, or in a large rectangular or square shaped showroom for automobiles. In addition, since skilled craftsmen demand high wages and many are union workers, by reducing the number of people needed to align various items, such as to install a tile floor, one can certainly reduce the overall cost. Furthermore, lifting, placing and positioning individual items, for example, ceramic tiles over an extended period of time can cause a craftsman to experience muscle soreness, back problems, knee issues and fatigue. By having a machine do the heavy lifting placing and positioning, one can extend the useful life of the skilled craftsman.

Now a machine has been invented which is capable of aligning items in a pattern as well as a method of using the machine.

SUMMARY OF THE INVENTION

Briefly, this invention relates to a machine for aligning items in a pattern and a method of use. The machine is mounted to a stationary object or surface but in some instances can be mounted on a movable platform or carriage which is capable of moving along an X-X axis and a Y-Y axis. The stationary surface can be a work bench, a counter top, a desk top, a pedestal, the floor, a vertical or angled wall, a ceiling, etc. The machine has a robotic assembly with four spaced apart joints, which include a base, a shoulder, an elbow and a wrist. The base joint is connected to the stationary surface and the wrist joint is capable of being spaced farthest away from the movable platform. Each of the joints has 360° of rotational motion. The machine further includes an effector having a first surface and an oppositely aligned second surface. The first surface is removable secured to the wrist joint. The effector has a first side, a second side, a third side and a fourth side, and the first side is perpendicularly aligned to the second side. The machine also has a suction cup mounted on the second surface of the effector which is connected to a vacuum source. The suction cup is capable to picking up, positioning and releasing an item relative to a first laid item and a second laid item. The first and second laid items each have an upper surface and each is aligned perpendicular to one another. The machine also includes first, second and third edge sensors. At least one of the three edge sensors is secured to the first side of the effector and is capable of detecting an edge aligned along an X-X axis of the first laid item, and at least one of the three edge sensors is secured to the second side of the effector and is capable of detecting an edge aligned along a Y-Y axis of the second laid item. The machine further includes first, second and third height sensors. At least one of the three height sensors is secured to the first side of the effector and is capable of detecting the height of the upper surface of the first laid item, and at least one of the three height sensors is secured to the second side of the effector and is capable of detecting the height of the upper surface of the second laid item.

The machine also includes a control mechanism for operating the robotic assembly, the vacuum source and the edge and height sensors. Lastly, the machine has a power source for supplying power to the control mechanism.

The method of using the machine includes mounting the machine to a stationary object or surface or to a movable platform capable of moving along an X-X axis and a Y-Y axis. The machine has a robotic assembly with four spaced apart joints. The joints include a base, a shoulder, an elbow and a wrist. The base joint is connected to the stationary object or surface or to the movable platform and the wrist joint is capable of being spaced farthest away from the stationary object or surface or from the movable platform. Each of the joints has 360° of rotational motion. The machine also has an effector having a first surface and an oppositely aligned second surface. The first surface is removable secured to the wrist joint. The effector has a first side, a second side, a third side and a fourth side, and the first side is perpendicularly aligned to the second side. The machine further has a suction cup mounted on the second surface of the effector which is connected to a vacuum source. The suction cup is capable to picking up, positioning and releasing a new item relative to a first laid item and a second laid item. The first and second laid items each have an upper surface and each is aligned perpendicular to one another. The machine also has first, second and third edge sensors. At least one of the three edge sensors is secured to the first side of the effector and is capable of detecting an edge aligned along an X-X axis of the first laid item, and at least one of the three edge sensors is secured to the second side of the effector and is capable of detecting an edge aligned along a Y-Y axis of the second laid item. The machine also has first, second and third height sensors. At least one of the three height sensors is secured to the first side of the effector and is capable of detecting the height of the upper surface of the first laid item, and at least one of the three height sensors is secured to the second side of the effector and is capable of detecting the height of the upper surface of the second laid item.

The machine also has a control mechanism for operating the robotic assembly, the vacuum source and the edge and height sensors. Lastly, the machine has a power source for supplying power to the control mechanism. The method includes the steps of applying a bonding material to a planar surface and then manually laying a row of items and a column of items. The row is aligned perpendicular to the column and the row has a first laid item and the column has a second laid item. The first laid item is offset from the second laid item. The method also includes positioning the machine such that the first side of the effector is located within a predetermined distance of the X-X axis of the first laid item, and the second side of the effector is located within a predetermined distance of the Y-Y axis of the second laid item. In this position, the machine is stationary. The method also includes using the control mechanism to move the robotic assembly such that the suction cups are positioned above a new item. The vacuum source is then activated to lift the new item and move it into position adjacent the X-X axis of the first laid item and the Y-Y axis of the second laid item using data generated by the first, second and third edge sensors and by the first, second and third height sensors. The method then applies a pre-calculated force against the new item and/or uses a height comparison of the new item relative to the adjacent set items to set the new item in a bonding material or into a jig. Additional items are then individually picked up, positioned and set in place such that an entire area can be constructed. The finished object can be any imaginable article or assembly including but not limited to: an electrical harness, a computer board, a color matrix, a tiled floor, a tiled wall, a construction panel, artwork, etc.

The general object of this invention is to provide a machine for aligning items in a pattern. A more specific object of this invention is to provide a machine which can align and install items in a pattern faster and more accurately than a skilled craftsman.

Another object of this invention is to provide a machine for aligning items in a pattern which can reduce time and cost.

A further object of this invention is to provide a machine which can install items on a horizontal surface as well as on a vertical surface.

Still another object of this invention is to provide a method of using the machine for aligning items in a pattern.

Still further, an object of this invention is to provide a portable machine that can be easily transported between job sites.

Other objects and advantages of the present invention will become more apparent to those skilled in the art in view of the following description and the accompanying drawings.

BRIEF DESCRIPTION OF THE DRAWINGS

FIG. 9 is a perspective view of a carriage.

FIG. 10 is a perspective view of a hollow rectangular sleeve having a pair of openings formed therethrough.

FIG. 13 is a top view of a single tile having a pattern formed on its upper surface.

FIG. 14 is a top view of a tile floor having a number of installed tiles and having 18 squares where new tile needs to be set.

FIG. 17 is a schematic showing three machines, one mounted to the floor, one mounted to a wall, and one mounted to the ceiling.

FIG. 18 is a schematic of the machine secured to a stationary object such as a pedestal.

FIG. 19 is a schematic of the machine secured to a movable pallet which uses eye bolts as attachment points for lifting and moving the pellet.

FIG. 20 is a schematic of the machine secured to a carriage which can move along a linear I-beam and the I-beam can extend into the interior of a hollow cylindrical member.

DETAILED DESCRIPTION OF THE INVENTION

Figure 1:
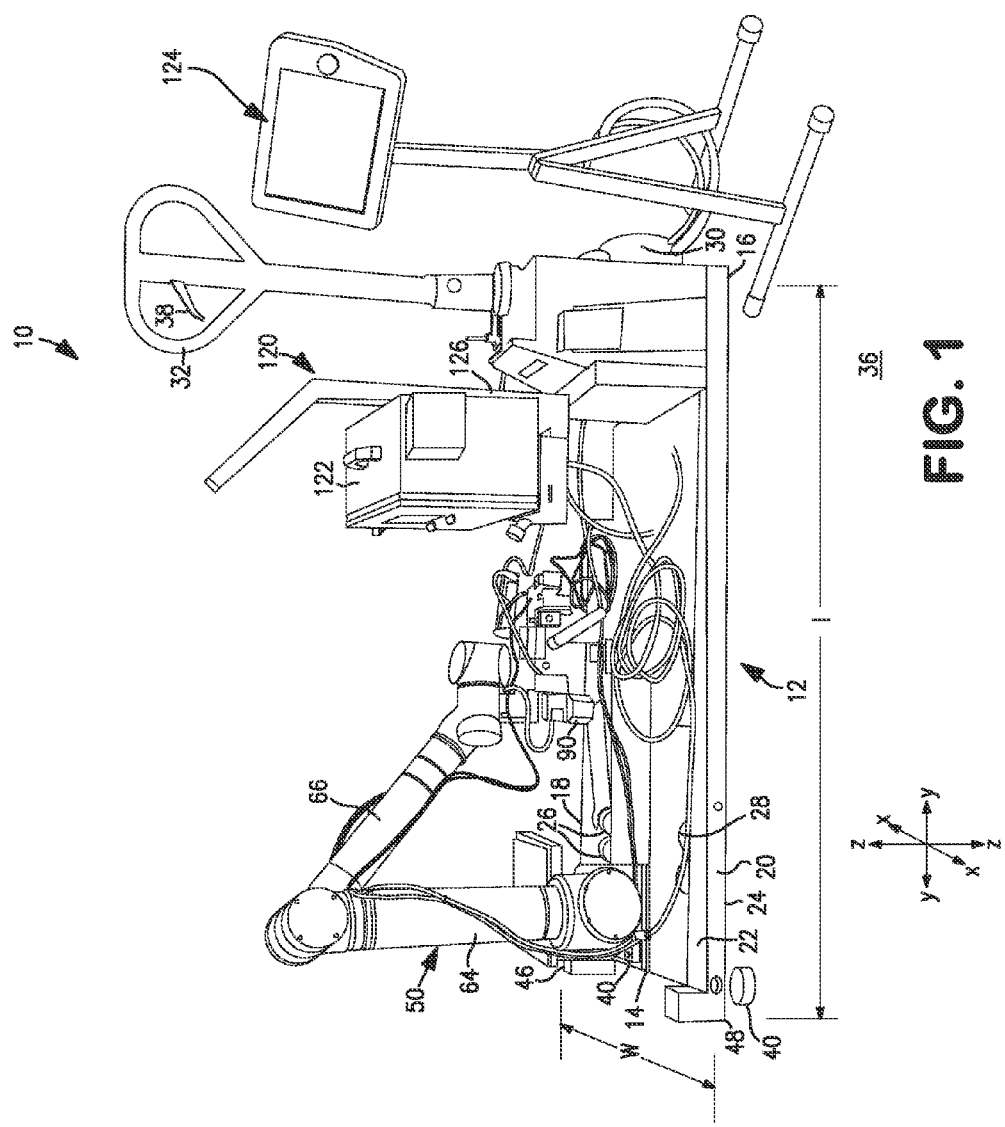
FIG. 1 is a perspective view of the machine for aligning items in a pattern.

Referring to FIG. 1, a machine 10 for aligning items in a pattern is shown. The machine 10 can be used for a variety of jobs including but not limited to: forming, assembling or constructing various articles, such as laying tile, building a computer board, arranging, electronic components, building an electrical harness, etc. The machine 10 will initially be described as setting tile in a desired pattern. By "tile" it is meant any kind of flooring, siding, roofing, or lining material which is a relatively thin, flat or convex shaped slab of hard material, such as baked clay or plastic, laid in rows to cover floors, walls, roofs, etc. A tile can vary in size, shape, weight, composition, geometrical form, thickness, etc. A tile could be a ceramic tile. By "ceramic" it is meant any of various hard, brittle, heat and corrosion-resistant materials made by shaping and then firing a nonmetallic mineral, such as clay, at a high temperature. The tile could also be a vinyl tile. By "vinyl" it is meant the univalent chemical radical $CH_2CH$; any of various easily polymerized compounds containing the vinyl radical, used as a basic material for plastics. The tile could further include but is not limited to: a clay tile, a plastic tile, a stone tile, a tile formed from a laminate, a wood tile, a glass tile, a tile formed from composite materials, a brick, a tile formed to look like a brick, a roof shingle, a roof panel, a wall panel, wall siding, etc. The tile can be formed from any known material. The tile can be formed from a single material or be formed from two or more different materials. The tile can be made from a natural material, a synthetic material or from a combination of both. The tile can vary in shape or configuration. The tile can be a square, a rectangle, a triangle or have some other geometrical or irregular shape provided it has an X-X axis and a Y-Y axis. The tile can vary in weight. The tile can weigh less than a once or weigh more than an ounce. The tile can vary in thickness. The tile can have a thickness that ranges from a few millimeters to a thickness of about 0.125 inches or more. The tile can have a plain appearance or contain a texture, pattern or some other surface geometry. It is also possible to coat, paint, spray, submerge the tile in a solution, decorate or somehow treat the tile to alter its appearance. The tiles can be used to cover a floor, a wall, a ceiling, a roof, etc. The tiles can also be used to line the inside of a furnace, the inside of a tank used to hold a liquid, solution or chemical, the inside surface of a swimming pool, the walkway around a swimming pool, etc. The tiles can be secured to a flat surface, a planar surface, a curved surface, a tapered surface, a sloping surface, an arcuate surface, steps, etc. The tiles can be used in a residential home, such as the floor of a foyer, hall way, kitchen, utility room, or bathroom. The tiles can also be used to cover the floor, walls and ceiling of a room, such as a bathroom. The tiles can further be used to cover the floors, walls and/or ceilings of retail, industrial, governmental and educational buildings and structures. The tiles can further be used around at least a portion of the outer perimeter of a space craft, an airplane, an armored vehicle, etc. The tiles can be used in various kinds of construction or products known to man.

In one embodiment, the machine 10 includes a movable platform 12 which is capable of moving along a longitudinal axis X-X and a transverse axis Y-Y. The movable platform 12 can also be constructed so as to move in three directions, along a longitudinal axis X-X, a transverse axis Y-Y and a vertical axis Z-Z, if desired. The movable platform 12 can vary in size, shape and construction. As shown in FIG. 1, the movable platform 12 has a first end 14, a second end 16, a first side 18 and a second side 20. The first end 14 is spaced apart from the second end 16, and the first side 18 is spaced apart from the second side 20. The movable platform 12 also has an upper surface 22 and a lower surface 24. The dimensions of the movable platform 12 can vary. The movable platform 12 has a length l and a width w. The length l can range from between about 2 feet to about 8 feet. Desirably, the length l ranges from between about 3 feet to about 7 feet. More desirably, the length l ranges from between about 4 feet to about 6 feet. Even more desirably, the length l is about 5 feet. The width w can range from between about 16 inches to about 50 inches. Desirably, the width w can range from between about 20 inches to about 40 inches. More desirably, the width w can range from between about 24 inches to about 32 inches. Even more desirably, the width w is about 28 inches.

The movable platform 12 can be constructed so as to be easily moved. This can be accomplished by using one or more wheels and/or tires. By "wheel" it is meant a solid disc or a rigid circular frame, designed to turn around a central axis; to turn around a central axis, revolve or rotate. By "tire" it is meant a covering for a wheel, usually made of rubber reinforced with cords of nylon, fiberglass or other material and filled with compressed air; a hoop of metal or rubber fitted around a wheel. As used throughout this application, the word "wheel" will encompass both a wheel and/or a wheel having a tire mounted on it. Besides, using one, two, three or more spaced apart wheels, one could also arrange the wheels in pairs so that the movable platform 12 is more stable.

The movable platform 12 is shown with first, second and third pairs of wheels, 26, 28 and 30 respectively. The two wheels making up each pair of wheels 26, 28 and 30 can be identical in size, shape, design, construction and material or they can be different. In addition, all three pairs of wheel 26, 28 and 30 can be of the same design or one or more of the pairs of wheels 26, 28 and 30 can be different. In FIG. 1 the first and second pairs of wheels 26 and 28 are depicted as being identical in size, shape and construction. Each of the first and second pairs of wheels, 26 and 28 respectively, is shown as consisting of two, cylindrically shaped wheels each mounted on an axle with one wheel positioned in front of the other wheel. It should be understood that the two wheels in a pair could be positioned side by side or be in some other arrangement. The first pair of wheels 26 is located adjacent to the first side 18 and inward from the first end 14. The second pair of wheels 28 is located adjacent to the second side 20 and inward from the first end 14. The distance the first and second pairs of wheels, 26 and 28 respectively, are located from the adjacent side and from the first end 14 can vary.

The third pair of wheels 30 is positioned outward from the second end 16 and midway between the first and second sides, 18 and 20 respectively. The third pair of wheels 30 is depicted as being constructed of rubber and having a disc shaped appearance. The third pair of wheels 30 has a larger diameter than either of the first or second pairs of wheels, 26 and 28 respectively. For example, the two wheels forming the third pair of wheels 30 have a diameter of about 8 inches. Any diameter wheel can be used but a larger diameter usually makes it easier to turn or rotate the wheel. The two wheels making up the third pair of wheels 30 also differ from the first and second pairs of wheels, 26 and 28 respectively, in that the two wheels making up the third pair of wheels 30 are positioned side by side and are separated by about 3 inches. The third pair of wheels 30 is capable of turning or rotating through an arc in excess of 90°. Desirably, the third pair of wheels 30 can turn or rotate through an arc of from between about 0° to about 270°. More desirably, the third pair of wheels 30 can turn or rotate through an arc of from between about 0° to about 180°.

The first, second and third pairs of wheels, 26, 28 and 30 respectively, can be formed from various materials known to those skilled in the art. The first, second and third pairs of wheels 26, 28 and 30 respectively, can be formed of metal, steel, aluminum, wood, rubber, plastic, a composite material or a from a combination of two or more different materials. Some examples of wheels formed from different material include but are not limited to: metal wheels, steel wheels, rubber wheels, fiberglass wheels, nylon wheels, etc. The first, second and third pairs of wheels, 26, 28 and 30 respectively, can also vary in size, shape, design and construction. For example, one or more of the first, second and third pairs of wheels, 26, 28 and 30 respectively, can be roller shaped cylindrical wheels, disc shaped wheels, spherically shaped wheels, round wheels, caster wheels, etc. By "caster wheel" it is meant a small wheel mounted on a swivel.

Still referring to FIG. 1, the third pair of wheels 30 is controlled by a handle 32. The handle 32 can vary in size shape and design. The handle 32 is designed to turn or rotate and is mechanically connected to the third pair of wheels 30 such that as an operator turns the handle 32 to the right, the third pair of heels 30 will turn to the right by an equal distance. If the operator turns the handle 32 to the left, the third pair of wheels 30 will turn a like distance to the left. One skilled in the art can optionally utilize a gear mechanism whereby a small turn of the handle 32 could translate into a larger turn by the third pair of wheels 30, if desired.

Figure 2:
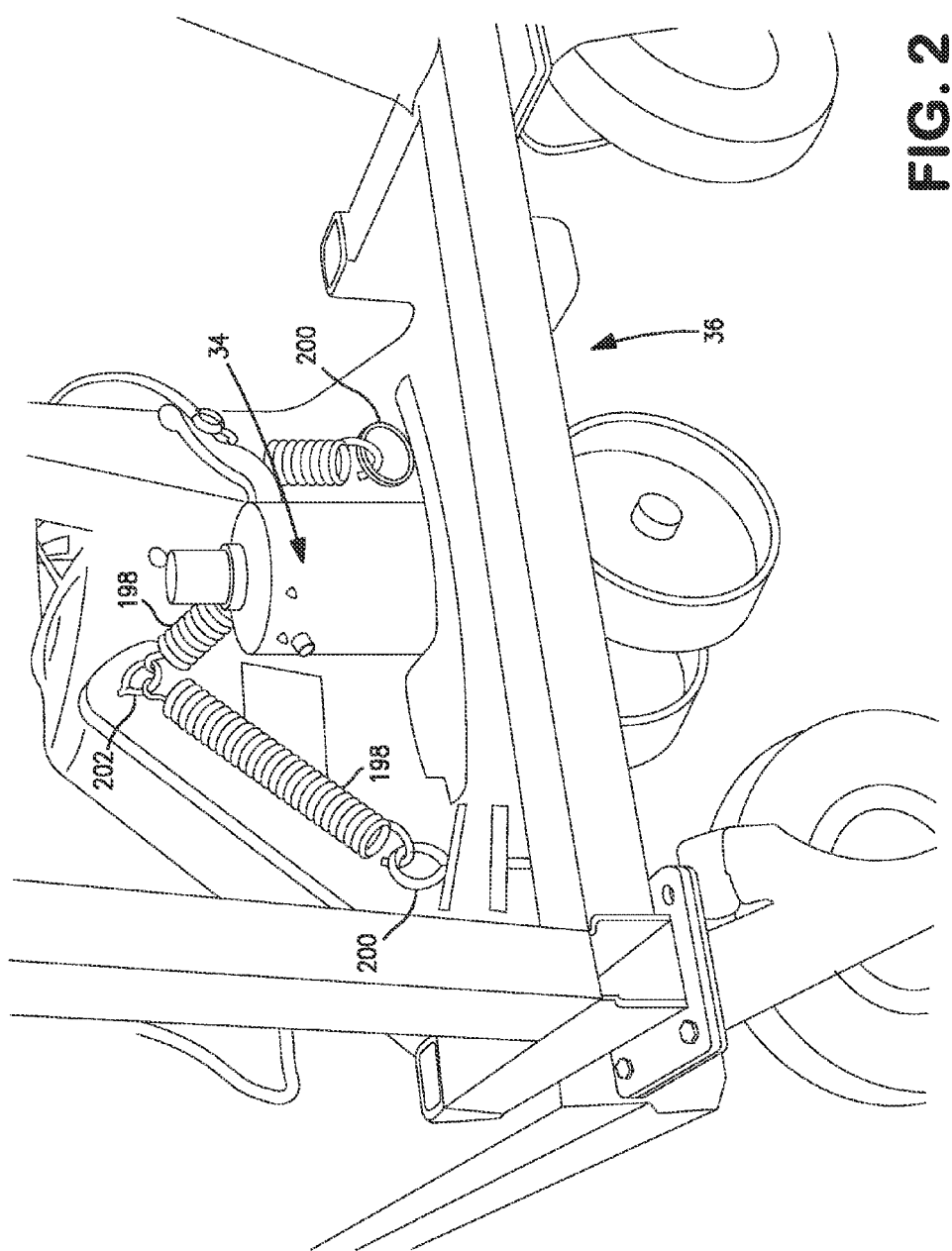
FIG. 2 is a perspective view of the second end of the machine for aligning items in a pattern showing the first hydraulic cylinder connected to the pump handle.

Referring to FIG. 2, the handle 32 is mechanically connected to a first hydraulic cylinder 34. The handle 32 is also pivoted such that it can be pumped or reciprocated up and down along the vertical axis Z-Z. This reciprocal movement of the handle 32 actuates the first hydraulic cylinder 34 and causes a piston rod connected thereto to incrementally advance outward from the first hydraulic cylinder 34. This pumping action of the handle 32 is similar to the pumping action of a hydraulic automobile jack. The handle 32 is also mechanically connected (not shown) to the first and second pairs of wheels, 26 and 28 respectively, such that reciprocating or pumping the handle 32 will cause the movable platform 12 to be elevated relative to an underlying surface 36. The underlying surface 36 is the concrete floor pictured in FIG. 2. The mechanical connection between the handle 32 and the first, second and third pairs of wheels, 26, 28 and 30 respectively, is well known to those skilled in the art and is commercially available from manufacturers of fork lift equipment.

Referring again to FIG. 1, the handle 32 is also equipped with a release lever 38. When an operator presses on the release lever 38, the hydraulic fluid in the first hydraulic cylinder 34 will be allowed to exit either to a reservoir or to the opposite side of the first hydraulic cylinder 34. As this occurs, the movable platform 12 will be lowered toward the underlying surface 36. This raising and lowering of the movable platform 12 occurs very quickly and the pumping action of the handle 32 requires only a small amount of force by an operator. Thus a single person can easily and quickly raise or lower the movable platform 12. In addition, the movable platform 12 can be easily maneuvered about the concrete floor in a building where tile is to be laid. The movable platform 12 is constructed to be moved by a single person who can push or pull the movable platform via the handle 32. Alternatively, the movable platform can be remotely operated by a person standing adjacent to it using a remote controller. Remote controllers are well known to those skilled in the art.

Figure 3:
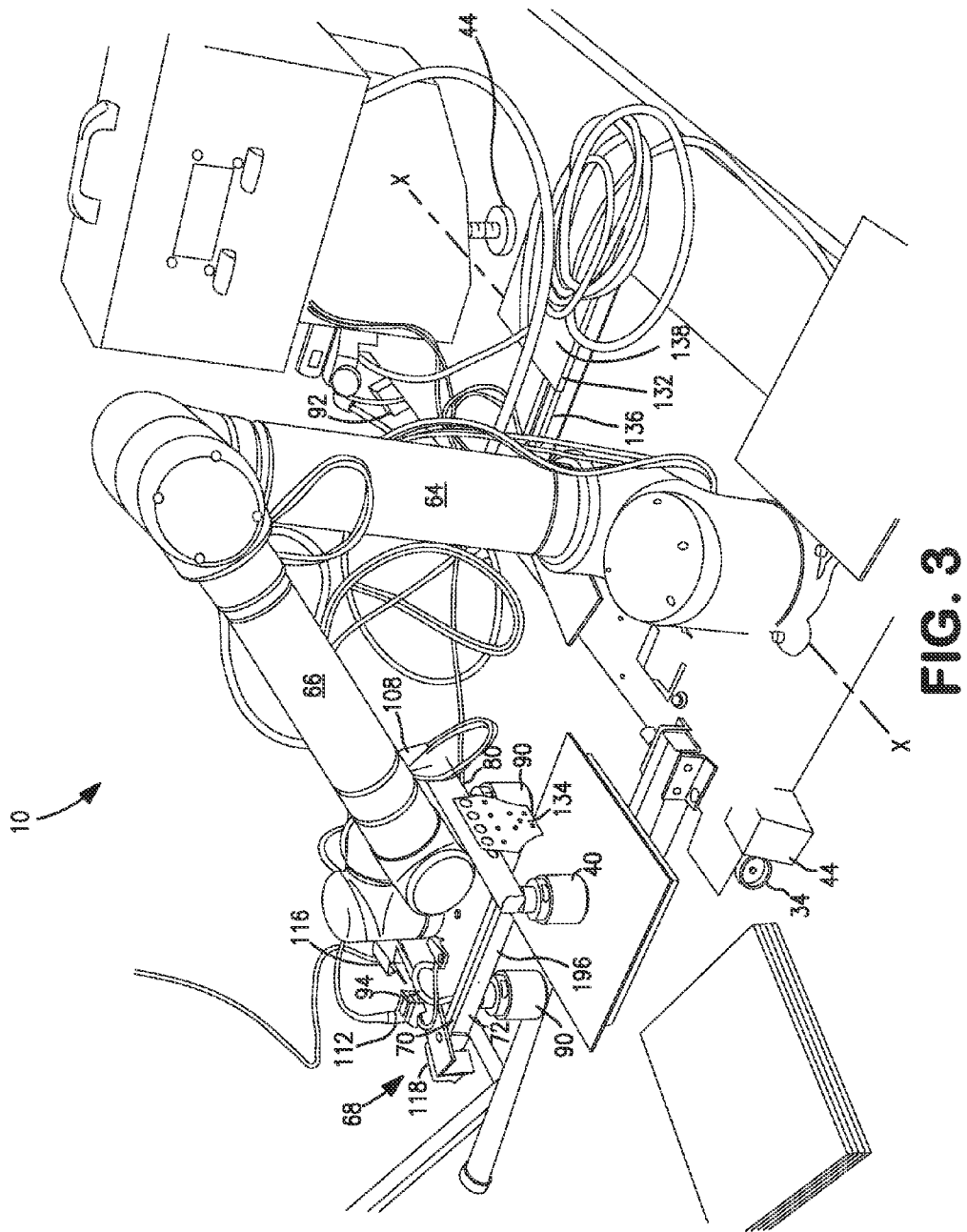
FIG. 3 is a perspective view of an effector attached to the robotic assembly and shows the third stabilizer.

Referring to FIGS. 1 and 3, the movable platform 12 is equipped with two or more stabilizers. The size, shape, configuration and number of stabilizers can vary. First, second and third stabilizers, 40, 42 and 44 respectively, are shown. Each of the first, second and third stabilizers, 40, 42 and 44 respectively, contains a vertically aligned, threaded stud (not shown) that engages with a threaded aperture (not shown) drilled and taped into the movable platform 12. The first stabilizer 40 is secured to the lower surface 24 of the movable platform 12 approximate a corner 46 formed by the junction of the first end 14 with the first side 18. The second stabilizer 42 is secured to the lower surface 24 of the movable platform 12 approximate a corner 48 formed by the junction of the first end 14 and the second side 20. The third stabilizer 44 is secured to the lower surface 24 of the movable platform 12 inward from the second end 16 and midway between the first and second sides, 18 and 20 respectively, see FIG. 3.

It should be understood that even though the machine 10 is shown as having three stabilizers, 40, 42 and 44, it is also possible to utilize two larger dimensioned stabilizer or four or more stabilizers, if desired. The size, shape and construction of each of the stabilizers 40, 42 and 44 can vary. The first, second and third stabilizers, 40, 42 and 44 respectively, can be identical in size, shape and construction or one or more of them can vary in size, shape and construction from the remaining stabilizers. In addition, the amount of vertical travel of each stabilizer 40, 42 and 44, on its respective vertical threaded stud, can also vary. Typically, the amount of vertical travel of each stabilizer 40, 42 and 44, on the treaded stud, is from between about 1 inch to about 4 inches.

When the movable platform 12 is resting on the first, second and third stabilizers, 40, 42 and 44 respectively, the first, second and third pairs of wheels, 26, 28 and 30 respectively, can be raised off of the underlying surface 36. Alternatively, the first, second and third pairs of wheels, 26, 28 and 30 respectively, can be in contact with the underlying surface 36 but essentially do not carry any of the load of the tile laying machine 10. With the first, second and third stabilizers, 40, 42 and 44 respectively, in contact with the underlying surface 36, they will bear the entire weight of the tile laying machine 10. In this position, the machine 10 is rendered stationary and will not move in the longitudinal X-X or transverse Y-Y directions.

Figure 4:
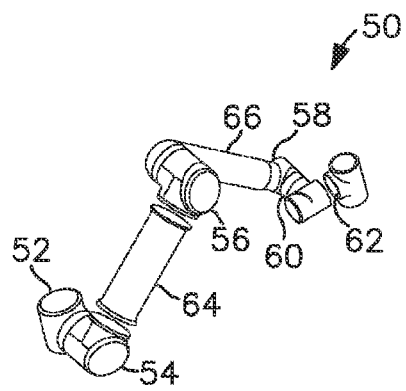
FIG. 4 is a schematic of the robotic assembly.

Referring to FIGS. 1, 3 and 4, the machine 10 also includes a robotic assembly 50. The robotic assembly 50 can vary in shape, design and construction. There are many commercial manufacturers of robotic equipment. One such manufacturer is Universal Robots having an office at Svendborgvej 102, Odense, Denmark. The robotic assembly 50 is a machine that can be programmed to move a tool, a device, a fixture, etc. The robotic assembly 50 can be programmed to communicate with other machines using electrical signals. The robotic assembly 50 can be formed from various materials. Extruded aluminum tubes are useful for forming the arms and joints. The robotic assembly 50 must have at least four spaced apart joints 52, 54, 56 and 58. Desirably, the robotic assembly 50 includes five or more joints 52, 54, 56, 58 and 60. More desirably, six joints 52, 54, 56, 58, 60 and 62 are utilized. The six joints include a base joint 52, a shoulder joint 54, an elbow joint 56, a first wrist joint 58, a second wrist joint 60 and a third wrist joint 62. When four joints are utilized, they include a base joint 52, a shoulder joint 54, an elbow joint 56 and a first wrist joint 58. The base joint is where the robotic assembly 50 is mounted to the movable platform 12. As shown in FIG. 1, the robotic assembly 12 should be secured to a front portion of the movable platform 12 approximate the first end 14. Desirably, the robotic assembly 50 is secured along the longitudinal central axis X-X of the machine 10, see FIG. 3. The reason for this is that it will insure that the weight of the robotic assembly 50 is evenly distributed across the width w of the movable platform 12.

It should be understood that the robotic assembly 50 could be mounted or secured to the movable platform 12 away from the longitudinal central axis X-X, if one so desires.

Referring to FIG. 4, the robotic assembly 50 clearly depicts a base joint 52, a shoulder joint 54, an elbow joint 56, a first wrist joint 58, a second wrist joint 60 and a third wrist joint 62. The terminal or outermost wrist joint 62 is used to support a tool, device, fixture, etc. The third wrist joint 62 is capable of being spaced the farthest away from the movable platform 12. Each of the four or more joints, 52, 54, 56, 58, 60 and 62 has 360° of rotational motion. This means that each joint 52, 54, 56, 58, 60 and 62 can rotate a full 360°. This feature is important when one needs to move and position a new tile adjacent to two perpendicularly aligned tiles that have already been set. By "set" it is meant that a tile has been bonded to an underlying structure, such as a floor, a concrete floor, a floor made of composite material, a vertical wall, a concrete wall, a wall formed from a composite material, a tapered wall, a plastered wall, a ceiling, a roof, steps, etc. A tile is normally set in position using a bonding material which has been smoothly and uniformly applied to the floor, wall or ceiling. For example, an adhesive, glue, cement, mortar, etc. can be used as the bonding material. It is also possible to weld, rivet or use mechanical fasteners when the tiles are metal tiles, such as roofing tiles. The bonding material is usually applied evenly so as to completely cover the underlying surface, i.e. floor, wall or ceiling, before the tile is set in place.

By coordinating the motion of each of the joints 52, 54, 56, 58, 60 and 62, the robotic assembly 50 can move a new tile around freely. The reach of the robotic assembly 50 can be varied by utilizing different length arms 64 and 66. Only two of the arms 64 and 66 have been given numbers. The arms are the tubular members located between each pair of joints 52 and 54, 54 and 56, 56 and 58, 58 and 60, and 60 and 62. Five arms are situated between the six pairs of joints. The arm 64 is located between the shoulder joint 52 and the elbow joint 54 and serves as the vertical mast in our robotic assembly 50. The arm 66 is located between the elbow joint 54 and the first wrist joint 56 and is typically the longest arm segment. The actual length of each arm can vary. Typically, the arms are of various lengths. The overall configuration of the arms and joints must be able to support the weight of the device used to pick up the new tiles and as well as the weight of the new tile itself.

Referring again to FIG. 3, the machine 10 also includes an effector 68. By "effector" it is meant a device used to produce a desired change in an object in response to input. The effector 68 has a first surface 70 and an oppositely aligned second surface 72. The first surface 70 is removable secured to one of the outermost wrist joint, 58, 60 or 62, depending on how many wrist joints are being used. In FIG. 3, the effector 68 is attached to the third wrist joint 62. The effector 68 can vary in shape. The effector 68 has a first side 74, a second side 76, a third side 78 and a fourth side 80. The first side 74 is perpendicularly aligned to the second side 76. Desirably, the effector 68 has a square configuration wherein each of the sides 74, 76, 78 and 80 are of equal length and the adjoining sides 74, 76, 78 and 80 are aligned at a 90° angle, when the tile being laid is a typical square tile, such as a floor tile. The effector 68 can be rectangular in shape if it is being used to set an elongated tile, such as a vinyl, wood or laminate floor or wall tile. The tile laying machine 10 is capable of laying tiles having a tongue and groove connection, a snap connection, an intermeshing or inter-engaging connection, or a tile that has to be angled during installation to a set tile in order to form a locking joint, etc. The tile laying machine 10 can also install tiles that need to be offset or overlapped from one another, such as roof shingles, wood shingles, etc. By "shingle" it is meant a thin oblong piece of material, such as wood, that is laid in overlapping rows to cover the roof or sides of a house or other building.

It should be understood that the effector 68 can vary in size, shape and configuration depending upon the overall length and width of the tile, the weight of the tile, the material from which the tile is constructed, etc. The effector 68 can be constructed out of various materials. Common materials include but are not limited to: metal, steel, aluminum, composite material, etc.

Figure 5:
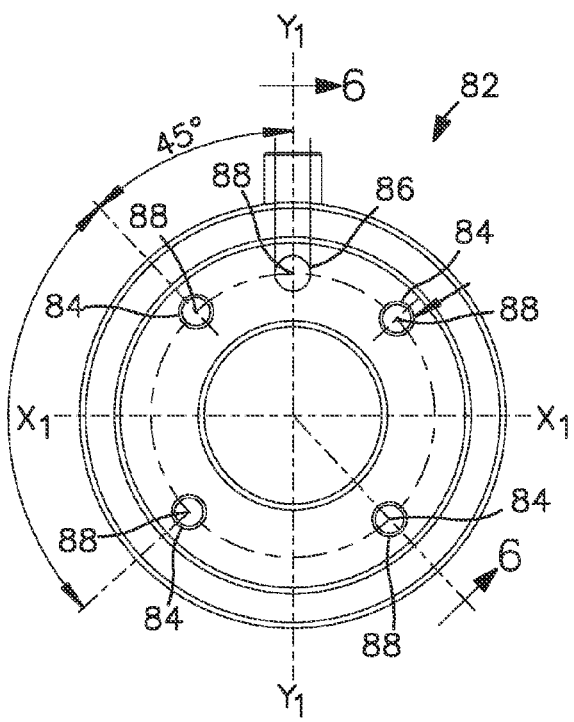
FIG. 5 is a front view of an alignment plate.
Figure 6:
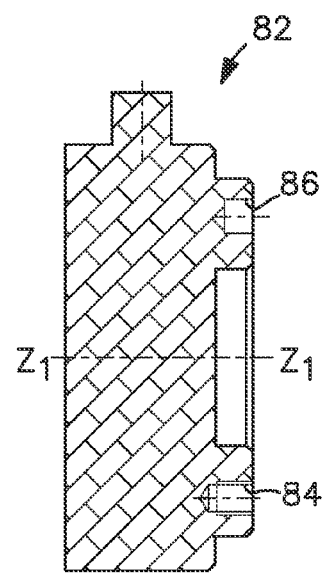
FIG. 6 is a cross-sectional view of the alignment plate shown in FIG. 5 taken along line 6-6.

Referring to FIGS. 5 and 6, the machine 10 can include an alignment plate 82 positioned between the outermost wrist joint, 58, 60 or 62 and the first surface 70 of the effector 68. The alignment plate 82 has a longitudinal central axis $X_1$-$X_1$, a transverse central axis $Y_1$-$Y_1$, and a vertical central axis $Z_1$-$Z_1$. The alignment plate 82 has four threaded apertures 84, 84, 84 and 84, and a non-threaded aperture 86 formed therein which are aligned parallel to the vertical central axis $Z_1$-$Z_1$. Each of the five apertures 84, 84, 84, 84 and 86 have a center point 88 aligned on a circle having a common central axis $Z_1$-$Z_1$. In other words, the center point 88 of each of the five apertures 84, 84, 84, 84 and 86 is equally spaced from the central axis $Z_1$-$Z_1$. Each of the four threaded apertures 84, 84, 84 and 84 are separated by an arc of 90°. In other words, a threaded aperture 84 is spaced 90° away from an adjacent threaded aperture 84. The non-threaded aperture 86 is positioned half way between two of the threaded apertures 84, 84. In other words, the non-threaded aperture 86 is spaced 45° from a threaded aperture 84. The size of the four threaded apertures 84, 84, 84 and 84 and the size of the non-threaded aperture 86 can vary. The non-threaded aperture 86 is designed to receive a pin (not shown) which is formed in the outermost wrist joint 58, 60 or 62. The outermost wrist joint is the third wrist joint 62 in FIG. 4. The engagement of the pin in the non-threaded aperture 86 ensures that the effector 68 will be properly aligned along the X-X axis of the outermost wrist joint 58, 60 or 62.

Referring again to FIG. 3, the machine 10 also includes one or more suction cups 90. Each suction cup 90 can vary in size, shape and design. When a plurality of suction cups 90 are utilize, each can be smaller in size than if one or two suction cups were used. Suction cups 90 are commercially available from various manufactures. VacMotion Inc. having an office at 34 Main Street, Plymouth, Mass. 02360 is one such supplier of suction cups 90. The suction cup 90 can vary in design. Round cups are best suited to smooth, flat surfaces. They will grip and release quickly. These cups hold their shape with extended use and grip well to vertical surfaces. Round cups with cleats are better at lifting heavy loads. Cups without cleats can be used for light lifting. Oval cups provide the most vacuum due to the larger surface area that contacts the tile. They provide more vacuum power than round cups and are suited to lifting heavy loads. They are designed to handle flat rigid sheet materials like wood, glass and composites. Bellow cups are best suited to textured, uneven surfaces. The folds, called "convolutions" provide a collapsible area that allows the cup to quickly compress when it touches the flat surface. The time needed to attach and release a tile when using bellow cups is greater due to the significant volume of the cup.

The weight that a suction cup 90 can lift and hold at a given pressure can vary. The weight of an individual tile can range from less than an ounce to more than a pound. Some roofing tile or siding tile can weight several pounds.

Desirably, four suction cups 90, 90, 90 and 90 are used, each arranged approximate a corner of a square floor tile. Three of the four suction cups 90, 90, 90 and 90 are visible in FIG. 3. However, if an elongated tile having a length of about 4 feet and a width of about 6 inches is being laid, it would be advantageous to space the three or more suction cups 90, 90 and 90 in a linear fashion at from between about 6 inches to about 12 inches apart. The number and arrangement of the suction cups can vary. The suction cups 90, 90, 90 and 90 are mounted or attached to the second or lower surface 70 of the effector 68. It is advantageous to space the suction cups 90, 90, 90 and 90 apart from one another so that the load of the individual tile is evenly distributed.

It should be understood that the machine 10 can be designed such that all of the available suction cups, whether it be one, two, three, four, five or more will cooperated to pickup, move and hold a single tile. Alternatively, the machine 10 can be designed such that each of the four suction cups 90, 90, 90 and 90 can pick up, move, position and hold an individual tile. Another option is to use two of the four suction cups 90, 90 to pickup, move and hold a single tile while the remaining two suction cups 90, 90 can pickup, move and hold a second tile. The overall size and weight of each tile certainly has to be factored in to such a design.

Still referring to FIG. 3, each of the four suction cups 90, 90, 90 and 90 is connected to a vacuum source 92 via a vacuum line 94. The vacuum source can be a vacuum pump or some other device that can create a vacuum. The vacuum can be controlled such that is can be intermittent. By creating a vacuum and routing it to the four suction cups 90, 90, 90 and 90 one can pickup, hold, move and position a tile. The machine 10 also has the ability to press the tile down into the cement or mud used to set the tile or to press the tile against an adhesive such that it can be bonded to the substrate, whether that be a floor, a wall, a ceiling, the side of a building or a roof being placed on a building. By releasing or cutting off the vacuum, the suction cups 90, 90, 90 and 90 can release their hold on the tile when the tile is in the proper location where it needs to be set. The suction cups 90, 90, 90 and 90 are capable to picking up, moving, positioning, holding and releasing a tile relative to an X-X axis of a first laid tile and a Y-Y axis of a second laid tile. The suction cups 90, 90, 90 and 90 are also capable of releasing a tile relative to an X-X axis of a first laid tile and a Y-Y axis of a second laid tile even when the X-X axis is offset from the edge of the first laid tile. For example, the machine 10 can set a roof tile in an overlapping arrangement relative to a previous set roofing tile.

In addition, the suction cups 90, 90, 90 and 90 can applied the correct amount of pressure to the upper surface of the tile to cause it to be aligned to the height of the neighboring tiles which have already been set. Each of the four suction cups 90, 90, 90 and 90 is capable of picking up, moving, positioning and releasing a tile, or two or more tiles simultaneously, and applying a downward force of from between about 10 Newton meter (Nm) to about 150 Nm to set the tile against a bonding material. By "Newton" it is meant the unit of force required to accelerate a mass of one kilogram one meter per second per second, equal to 100,000 dynes.

Figure 7:
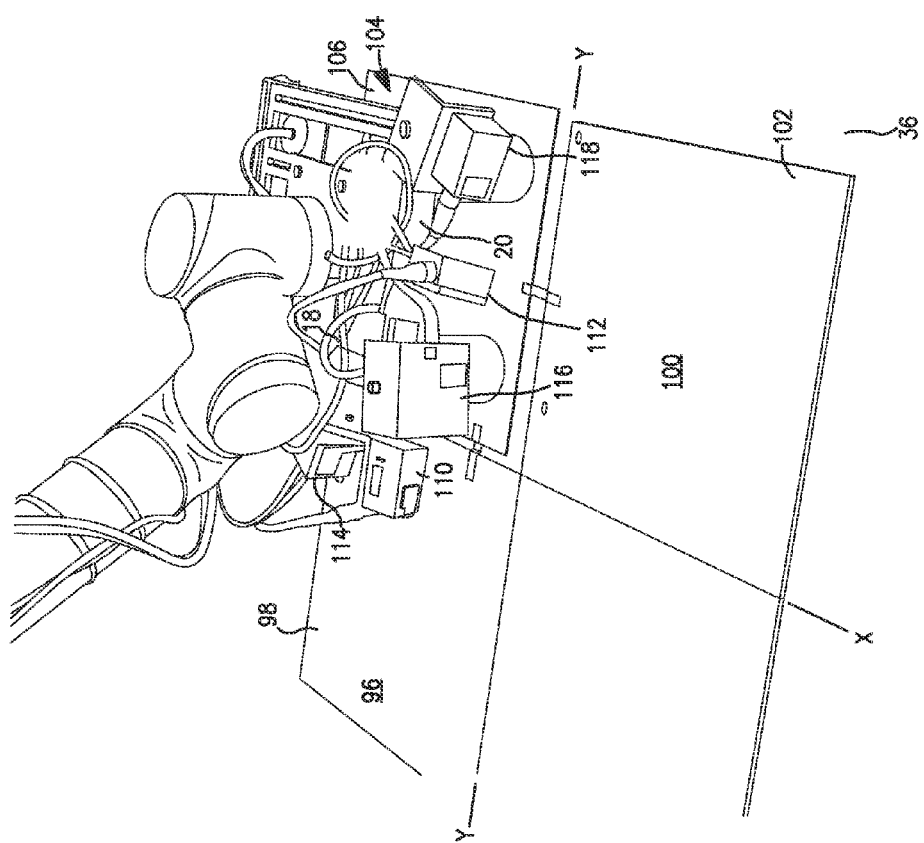
FIG. 7 is a perspective view of the end of the robotic assembly setting a tile in place.

Referring to FIG. 7, a first laid tile 96 having an upper surface 98 and a second laid tile 100 having an upper surface 102 have been already set onto an underlying substrate 36, i.e. a concrete floor, using a adhesive, cement, mud, or some other bonding material.

As noted above, a metal tile, such as a roofing tile can be set using welds, rivets or mechanical fasteners.

A new item 104, sometimes referred to herein as a "to be installed item or tile" has an upper surface 106. The new item 104 is held by the four suction cups 90, 90, 90 and 90 of the machine 10. The new item 104 is positioned relative to the X-X axis of the first laid tile 96 and the Y-Y axis of the second laid tile 100. The first laid tile 96 is aligned perpendicular to the second laid tile 100.

Referring to FIGS. 3 and 7, the machine 10 also includes first, second and third edge sensors, 108, 110 and 112 respectively. The first edge sensor 108 is pictured in FIG. 3 and the second and third edge sensors 110 and 112 are clearly shown in FIG. 7. At least one of the three edge sensors 108, 110 and 112 is secured to the first side 74 of the effector 68 and at least one of the edge sensors 108, 110 and 112 is secured to the second side 76 of the effector 68. In FIG. 7, two of the edge sensors 108 and 110 are mounted or attached to the first side 74 of the effector 68 and the third edge sensor 112 is secured or attached to the second side 76 of the effector 68. Alternatively, the edge sensor 108 could be secured to the first side 74 of the effector 68 and the remaining two edge sensors 110 and 112 could be secured to the second side 76 of the effector 68. At least one of the three edge sensors 108, 110 and 112 is secured to the first side 74 of the effector 68 and is capable of detecting an edge aligned along an X-X axis of the first laid tile 96. At least one of the three edge sensors 108, 110 and 112 is secured to the second side 76 of the effector 68 and is capable of detecting an edge aligned along a Y-Y axis of the second laid tile 100. All three edge sensors 108, 110 and 112 can be utilized sequentially or simultaneously. Three edge sensors 108, 110 and 112 are needed to establish a 3 point triangular system for correctly positioning the new tile 104 relative to the first and second laid tiles 96 and 100.

It should be understood that even though the present description teaches positioning a new item (tile) 104 relative to the X-X edge and the Y-Y edge of first and second laid tiles, 96 and 100 respectively, the machine 10 is also capable of positioning a new item (tile) 104 relative to an X-X edge and a Y-Y edge of two perpendicularly aligned members. The two members can be wood or metal forms, be an edge having a depth dimension, be an existing vertical wall, etc. In addition, the machine 10 is further capable of positioning a new tile item (tile) 104 in an overlapping or offset pattern relative to an X-X edge and a Y-Y edge of two previously laid tiles or members. Furthermore, the machine 10 is capable of positioning a new item (tile) 104 at a set distance away from an existing X-X edge and an existing Y-Y edge of two previously laid tiles or members. This is very useful when a grout line, having a thickness of about 0.25 inches, is required between adjacent tiles.

The three edge sensors 108, 110 and 112 can be any of a variety of commercially available sensors. The three edge sensors 108, 110 and 112 can be light sensors, photo sensors, laser sensors, optical sensors, cameras, etc. A company that sells sensors is Schmitt Industries, Inc. having an office at 2765 NW Nicolai Street, Portland, Oreg. 97210. Schmitt Industries, Inc. sells a model of laser sensors under the trademark "Acuity". Another company that sells sensors is Bytewise having an office at 1150 Brookstone Center Parkway, Columbus, Ga. 31904. Bytewise sells laser sensors under the name "Cross Check". A third company that sells sensors is SICK AG having an office at ErwinpSick—Str. 1, 79183 Waldkirch, Germany. Still another company that sells sensors is Micro-Epsilon having an office at 8120 Brownleigh Drive, Raleigh, N.C. 27617.

It should be noted, that when a laser sensor is utilized, a computer switch with an I.P. address is needed. Those skilled in the laser arts will be aware of the various components needed to make the laser sensors operate properly.

Still referring to FIG. 7, the machine 10 further includes first, second and third height sensors, 114, 116 and 118 respectively. At least one of the three height sensors 114, 116 and 118 is secured to the first side 74 of the effector 68 and is capable of detecting the height of the upper surface 98 of the first laid the 96. In FIG. 7, one height sensor 114 is mounted or attached to the first side 74 of the effector 68 and the two remaining height sensors 116 and 118 are secured or attached to the second side 76 of the effector 68. Alternatively, two height sensors 114 and 116 could be secured to the first side 74 of the effector 68 and the remaining height sensor 118 could be secured to the second side 76 of the effector 68. At least one of the three height sensors 114, 116 and 118 is secured to the second side 76 of the effector 68 and is capable of detecting the height of the upper surface 102 of the second laid tile 100. All three height sensors 114, 116 and 113 are utilized sequentially or simultaneously. Three height sensors 114, 116 and 118 are needed to establish a 3 point triangular system for correctly positioning the upper surface 106 of the new tile 104 relative to the height of the first and second laid tiles 96 and 100.

The three height sensors 114, 116 and 118 can be any of a variety of commercially available sensors. The three height sensors 114, 116 and 118 can be light sensors, photo sensors, laser sensors, etc. Height sensors are available from the four companies listed above.

It should be understood that each of the first, second and third edge sensors, 108, 110 and 112 can be a photo sensor or a laser sensor. Likewise, each of the first, second and third height sensors, 114, 116 and 118 can be a photo sensor or a laser sensor. All of the sensors 108, 110 and 112, 114, 116 and 118 can be light sensors, photo sensors, laser sensors, optical sensors, cameras, etc. Another option is to use some of each kind of sensor for both the edge sensors and for the height sensors. A camera can be substituted to serve the same function as a edge sensor in some instances.

Referring again to FIG. 1, the machine 10 further includes a control mechanism 120 for operating the robotic assembly 50, the vacuum source 92, the three edge sensors 108, 110 and 112, and the three height sensors 114, 116 and 118. The control mechanism 120 can include a computer 122 and a computer touch pad 124. Alternatively, the control mechanism 120 can be connected to a computer 122 such that it can activate the computer 122 when needed.

Software designed for operating the machine 10 is loaded into the computer 122. An operator can control the movement of the robotic assembly 50 by using the touch pad 124. Alternatively, an operator could type or key in information into the computer 122 using a key pad. The vacuum source 92 can be turned on and off manually or automatically by entries received by the computer 122 from the three edge sensors 108, 110 and 112, and from the three height sensors 114, 116 and 118. Those skilled in the computer art are knowledgeable on how to write software and how to program the computer to perform the intended operation.

The machine 10 also has a power source 126. The power source 126 can be a battery or some other type of power. When the power source 126 is a battery, it can be situated on the movable platform 12. Alternatively, the power source 126 can be an electrical outlet and an electrical cord (not shown) can be connected between the electrical outlet and the control mechanism. The power source 126 supplies power to the control mechanism 120, i.e. the computer, the computer touch pad, the vacuum pump, power to operate the edge and height sensors 108, 110, 112, 114, 116 and 118.

Figure 8:
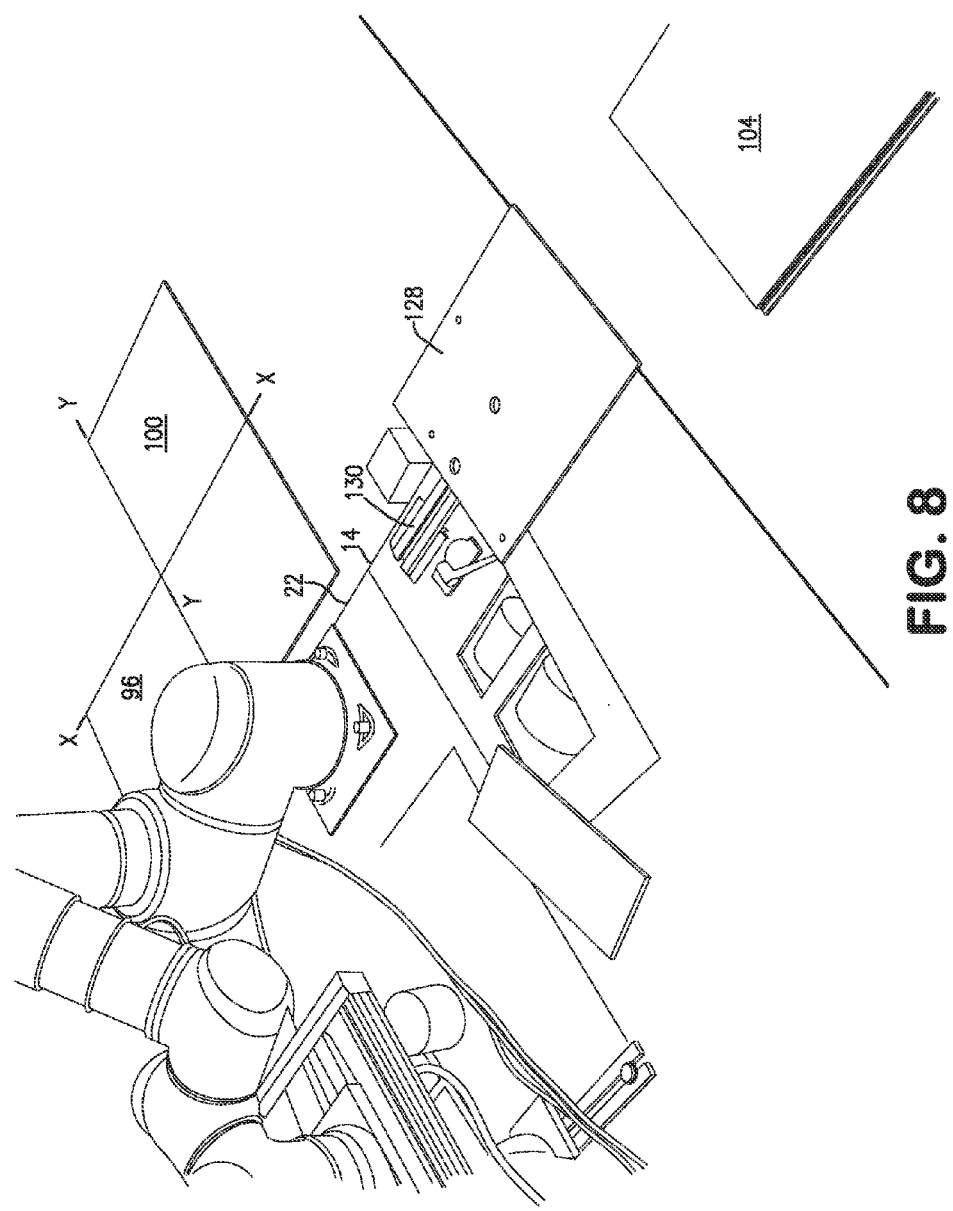
FIG. 8 is a perspective view of the machine for aligning items in a pattern having a cantilever storage area.

Referring to FIG. 8, the machine 10 can include a storage area 128 which is mounted on the movable platform 12. The storage area 128 can vary in size and shape. Desirably, the storage area 128 is a flat member. The storage area 128 can be located within the perimeter of the upper surface 22 of the movable member 12. In this embodiment, several stacks of new tiles 104 could be positioned in easy reach of the robotic assembly 50. The number of new tiles 104 that can be held in the storage area 128 can vary. The number of new tiles 104 that can be stacked in the storage area 128 will depend on the type of tiles, the weight of the tiles, the thickness of the tiles, and the size and shape of the tiles. It is possible to store from one to several hundred new tiles 104 on the storage area 128. Alternatively, the storage area 128 can be attached to a movable member 130 such that it can project outward from the upper surface 22 in a cantilever fashion, as is depicted in FIG. 8. By "cantilever" it is meant a member, such as a beam, that projects beyond a fulcrum and is supported by a balancing member or a downward force behind the fulcrum. This storage area 128 can support a plurality of new items (tiles) 104. The number of new items (tiles) 104 can vary. The storage area 128 shown in FIG. 8 can support a single stack of new items (tiles) 104. The number of new items (tiles) 104 that can be stacked on the storage area 128 will depend on the type of tiles, the weight of the tiles, the thickness of the tiles, and the size and shape of the tiles. For vinyl tiles, which are light weight and very thin, the storage area 128 could hold from 1 to about 200 tiles in a single stack.

The storage area 128 can be designed to hold multiple stacks of tile. For example, with different color tile, one stack could hold tile of a first color, a second stack could hold tile of a second color, a third stack could hold tile of a third color, etc.

The new items (tiles) 104 will be individually picked up by the suction cups By rotating and manipulating the arms 64 and 66, as well as the other arms of the robotic assembly 50, one can move and positioned a single new item (tile) 104 into a desired alignment with two existing laid tiles 96 and 100. The new item (tile) 104 will be properly positioned and then set into the adhesive, cement or other kind of bonding material. Alternatively, metal tiles could be welded, riveted, or set using mechanical fasteners.

The orientation of a new item (tile) 104 can be adjusted to match up with exiting set tiles. For example, if the new item (tile) 104 contains a particular grain pattern, or if different color new tiles 104 are being installed to create a unique pattern, then a bar code, logo or sticker could be applied to each new item (tile) 104 and this information can be keyed into the computer. The suction cups 90 can pick up and correctly position a new item (tile) 104 relative to adjacent set tiles so that a proper grain pattern, color pattern, etc. is obtained.

The suction cups 90 will then apply a force, such as a downward force when installing floor tile 104, to press the new item (tile) 104 against the bonding material such that the upper surface 106 of the new item (tile) 104 will horizontally match up with the uppers surfaces 98 and 102 of the first and second previously laid tiles, 96 and 100 respectively.

Referring again to FIG. 3, the machine 10 can further include a first locking member 132 and a second locking member 134. The first locking member 132 is secured to a support 136. The support 136 is in turn secured to the movable platform 12. Desirably, the first locking member 132 is located midway between the first and second sides 18 and 20 of the movable platform 12. More desirably, the first locking member 132 is located along the longitudinal center line X-X. The first locking member 132 has a threaded aperture 138 formed therein. The second locking member 134 is secured to the fourth side 80 of the effector 68. The second locking member 134 is also depicted as a plate having at least one opening 140 formed therethrough. The first and second locking members, 132 and 134 respectively, are depicted as mating members that can be brought into physical contact with one another such that the opening 140 formed in the second locking member 134 is aligned with the threaded aperture 138 formed in the first locking member 132. A threaded stud or pin (not shown) can then be inserted through the opening 140 and be treaded into the threaded aperture 138 to secure the two locking members 132 and 134 together. The engagement of the first and second locking members, 132 and 134 respectively, prevents the robotic assembly 50 from moving when the machine 10 is transported between job sites or between work areas.

It should be understood that other types of locking mechanisms employing various types of mechanical connections and known to those skilled in the art could be utilized in place of the first and second locking members, 132 and 134 respectively, discussed above.

Referring now to FIG. 9, the machine 10 can further include a carriage 142. The carriage 142 is used to elevate the machine 10 from the underlying surface 36 and to make it easy to move the machine 10 from one location to another. The carriage 142 is especially useful when transporting the machine 10 between job sites or work areas where the underlying surface is not smooth or is rough. In FIG. 9, the carriage 142 is shown in a compact storage mode when it is not being used. The carriage 142 has a front section 144 with a pair of wheels 146 and a rear section 148 with a pair of wheels 150. Each pair of wheels 146 and 150 includes rather large wheels. By "large wheels" it is meant the wheels forming each pair of wheels 146 and 150 have a diameter of at least about 6 inches. Desirably, each wheel in the two pairs of wheels 146 and 150 has a diameter equal to or greater than about 7 inches. More desirably, each wheel in the two pairs of wheels 146 and 150 has a diameter equal to or greater than about 8 inches. Even more desirably, each wheel in the two pairs of wheels 146 and 150 has a diameter ranging from between about 8 inches to about 20 inches.

The carriage 142 also has an upwardly extending push handle 152 secured to the rear section 148. In addition, the front section 144 has a pair of dropdown members 154, 154 each having an aperture 156 formed therethrough, and the rear section 148 has a pair of dropdown members 158, 158 each having an aperture 160 formed therethrough.

Referring to FIGS. 9 and 10, the carriage 142 also utilizes a pair of hollow rectangular sleeves 162, 162. Each sleeve 162 is slid upward and surrounds one of the pairs of dropdown members 154 and 158 on opposite sides of the carriage 142. The pair of sleeves 162, 162 retains the front section 144 to the rear section 148 together, as is pictured in FIG. 9. Each of the pair of sleeves 162, 162 has a pair of openings 164 formed completely through two oppositely aligned side walls 166, 166 of each sleeve 162, see FIG. 10. One of the pair of openings 164, 164 is formed through the dropdown member 154 and the other opening 164 is formed through the dropdown member 158, on each side of the carriage 142. A pair of pins 168, 168 is positioned through the pair of openings 164, 164 on each side of the carriage 142.

Figure 11:
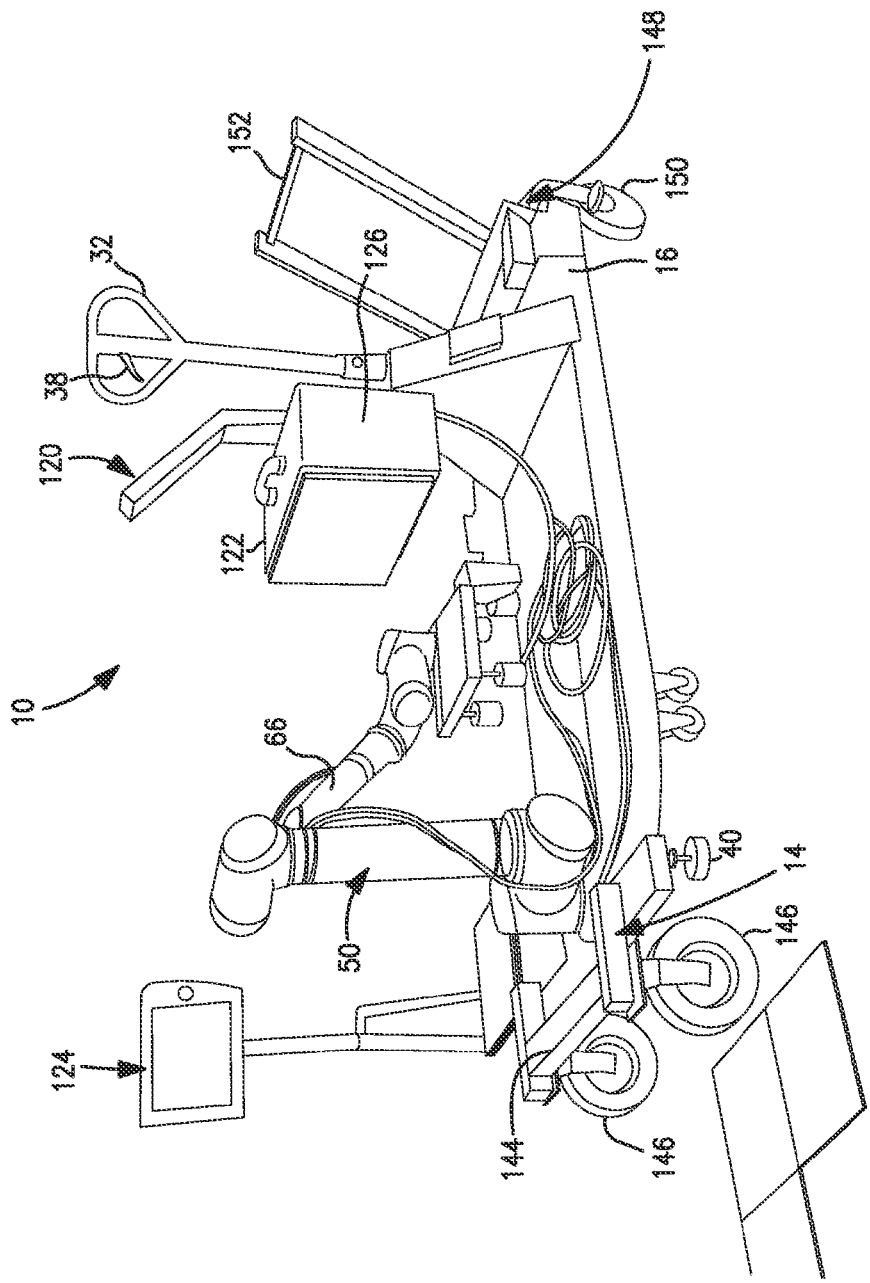
FIG. 11 is a perspective view of the machine for aligning items in a pattern supported on a carriage, after the carriage has been divided into a front section and a rear section.

Referring to FIG. 11, the carriage 142 is shown having been separated into the front section 144 and the rear section 148 by removing the pair of pins 168, 168 from each side of the carriage 142. The pair of sleeves 162, 162 is then removed by sliding them downward off of the dropdown members 154 and 158 on each side of the carriage 142. The pair of sleeves 162, 162 are then stored in a safe place until needed again. The front section 144 is secured to the first end 14 of the movable platform 12 via the pair of dropdown members 154, 154 and the pair of pins 168, 168. The pair of pins 168, 168 will engage with openings (not shown) formed in the first and second sides, 18 and 20 respectively, of the movable platform 12. The rear section 148 is secured to the second end 16 of the movable platform 12 via the pair of dropdown members 158, 158 and the pair of pins 168, 168. The pair of pins 168, 168 will engage with openings (not shown) formed in the first and second sides, 18 and 20 respectively, of the movable platform 12. Since the pair of wheels 146 on the front section 144 and the pair of wheels 150 on the rear section 148 is large, they will cause the movable platform 12 to be elevated or raised up off of and away from the underlying surface 36. The push handle 152 provides an easy and convenient way to move the machine 10 around.

After the machine 10 has been transported to a new work area, the front and rear sections. 144 and 148 can be removed and reassembled into the mode or embodiment shown in FIG. 9.

Figure 12:
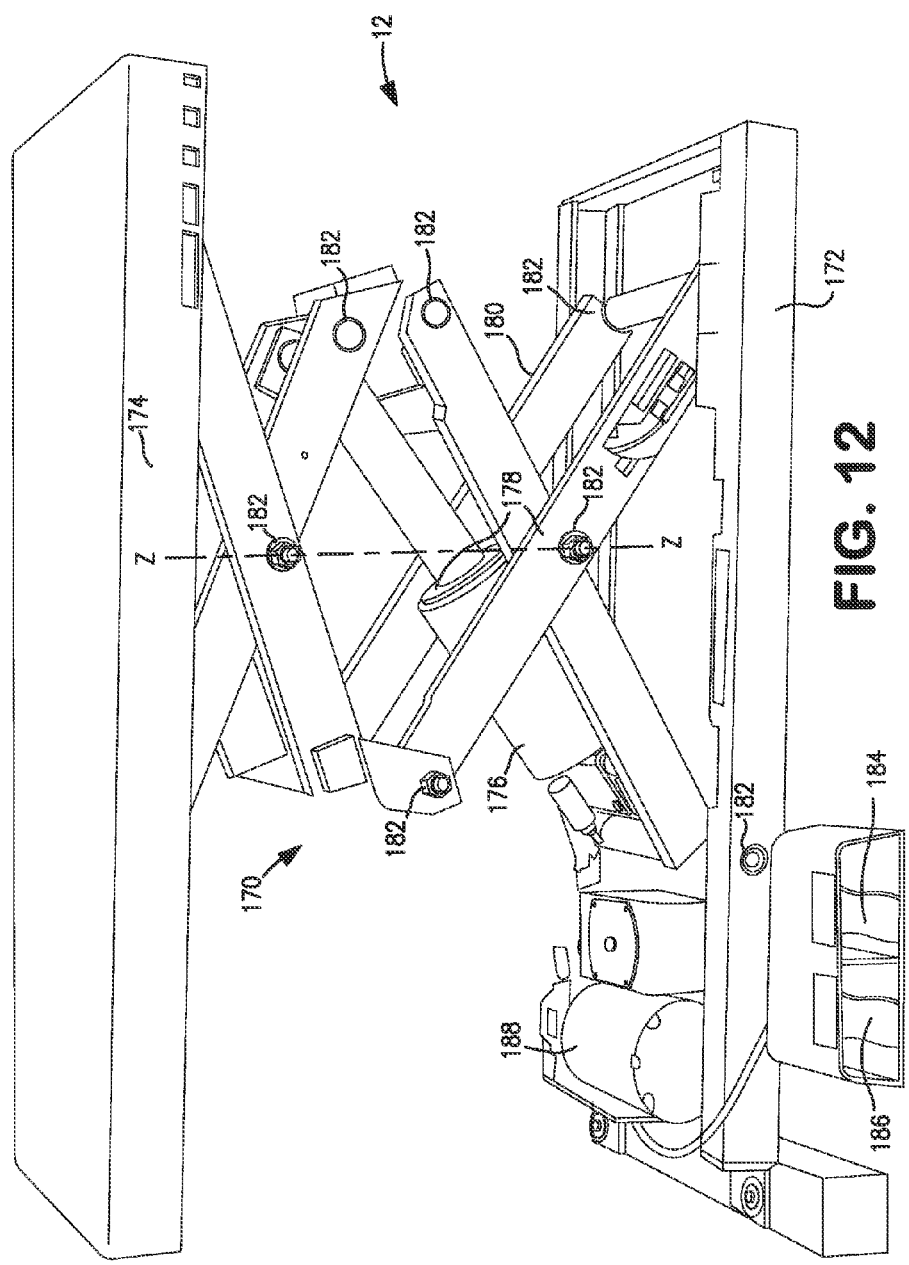
FIG. 12 is a perspective view of a scissor lift.

Referring to FIG. 12, the machine 10 can also include a scissor lift 170. The scissor lift 170 can be mounted to the movable platform 12. For example, the scissor lift 170 can be located between the upper and lower surfaces, 22 and 24 respectively, of the movable platform 12 or be positioned above the upper surface 22 or below the lower surface 24. If the scissor lift 170 is positioned above or below the upper or lower surfaces, 22 and 24 respectively, then minor reconfiguration may be required as to mounting the robotic assembly 50 and the first, second and third stabilizers, 40, 42 and 44 respectively. The scissor lift 170 is a commercially available device. The scissor lift 170 functions to raise or elevate the robotic assembly 50 such that it can reach a higher height. This is useful when applying tile to the upper regions of a wall or applying tile to a ceiling.

The scissor lift 170 includes a first member 172 mechanically linked to a second member 174 and having a hydraulic cylinder 176 positioned therebetween. A pair of extendable and retractable scissors 178 and 180 is aligned side by side. A plurality of spaced apart pivot rods 182 connects the pair of scissors together. The hydraulic cylinder 176 is attached to one of these pivot rods 182. The scissor lift 170 also has an up foot pedal 184 and a down foot pedal 186 which are electrically connected to an electric motor 188. Actuation of the up foot pedal 184 will cause the hydraulic cylinder 176 to raise the second member 174 vertically, along a Z-Z axis, relative to the first member 174 from an initial down position to a predetermined height. The scissor lift 170 can be constructed such that it can raise the second member 174 upward from the first member 172 by any desired height Desirably, the second member 174 can be raised upward by at least about 60 inches from the first member 172. More desirably, the second member 174 can be raised upward by at least about 72 inches from the first member 172. Even more desirably, the second member 174 can be raised upward by at least about 84 inches from the first member 172. Most desirably, the second member 174 can be raised upward by at least about 90 inches from the first member 172.

Referring now to FIGS. 13 and 14, a tile 190 is shown having an upper surface 192 with a grain pattern 194 formed therein. The pattern 194 can be any pattern imaginable by a human being. In FIG. 13, the pattern 194 is depicted as a plurality of spaced apart, dashed lines aligned parallel to one another. In installing the tiles 194, 194, one may wish to alternate the pattern 194 on each tile 190 from horizontal and vertical, to provide an aesthetically pleasing design. This produces a 90° orientation as is shown in FIG. 14. Another option is to install the tiles 190, 190 such that the pattern 194 on each tile 190 is arranged parallel to the adjacent tiles 190, 190.

It should be understood that a tile could also have a unique texture or color, or contain an image, design or picture on its upper surface which needs to be coordinated with adjacent tiles to form an overall pattern, image or design. This is also possible using the machine 10 of this invention.

Referring to FIGS. 3 and 14, arranging the individual tiles 190, 190 in a particular pattern is possible by mounting a camera 196 to the effector 68. The camera 196 can vary in design and construction. Various manufactures sell cameras which could be utilized with this machine 10. The camera 196 is capable of taking an image of a grain pattern 194 formed in the upper surface 192 of a first laid tile 190', taking an image of a grain pattern 194 formed in the upper surface 192 of a second laid tile 190", and taking an image of a grain pattern 194 formed in an upper surface 192 of the to be installed tile 190 when the to be installed tile 190 is positioned relative to the X-X axis of the first laid tile 190' and the Y-Y axis of the second laid tile 190". These images are taken and compared to one another using the control mechanism 120 and the computer 122. The to be installed tile 190 is not released from the suction cups 90, 90, 90 and 90 until the images of the three grain patterns 194, 194 and 194 of tiles 190, 190' and 190" are compared to ensure that the grain pattern 194 in the to be installed tile 190 is properly aligned relative to the grain patterns 194, 194 in the first and second laid tile, 190' and 190" respectively.

As clearly depicted in FIG. 14, the grain pattern 194 in the "to be installed tile" 190 will be orientated 90° to the grain pattern 194 in the second laid tile 190".

Referring again to FIG. 2, a pair of springs 198, 198 is secured between upper surface 22 of the movable platform 12 and a point where a piston rod extending out of the first hydraulic cylinder 34 is connected to the framework supporting the handle 32. A lower end of each of the pair of springs 198, 198 is attached to the movable platform 12 at attachment point 200 and an upper end of each of the pair of springs 198, 198 is attached to the framework supporting the handle 32, at attachment point 202. The pair of springs 198, 198 serves to urge the movable platform 12 upward as the hydraulic fluid in the first hydraulic cylinder 34 is released. This means that the first, second and third pairs of wheels, 26, 28 and 30 will return to the underlying surface 36 quickly once the release lever 38 is activated.

Figure 15:
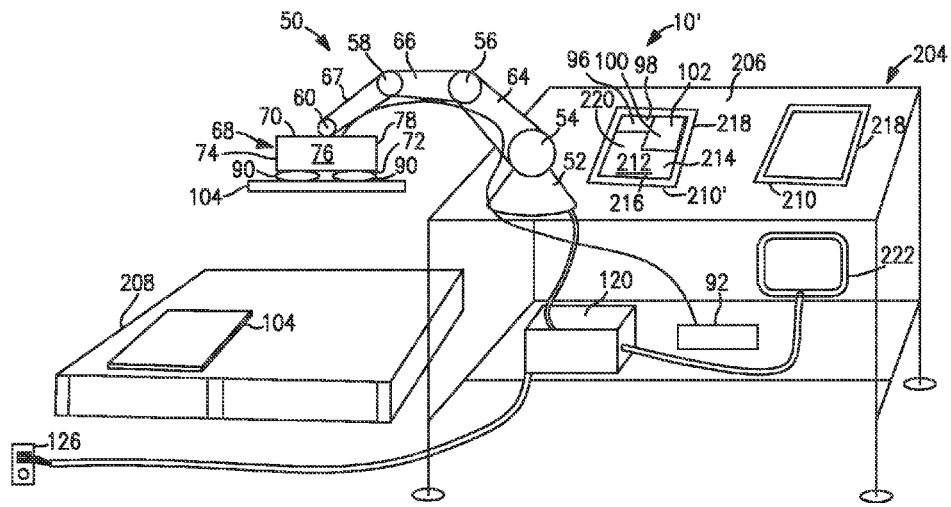
FIG. 15 is a schematic of the machine secured to a stationary object such as a work bench or table wherein items are positioned in a frame.

Referring now to FIG. 15, a second embodiment of a machine 10' for aligning items in a pattern is shown. In this embodiment, the machine 10' includes a robotic assembly 50 having at least four spaced apart joints. Five joints are shown in FIG. 15. The five joints include a base joint 52, a shoulder joint 54, an elbow joint 56, a first wrist joint 58 and a second wrist joint 60. An arm 64 is present between the shoulder joint 54 and the elbow joint 56, an arm 66 is present between the elbow joint 56 and the first wrist joint 58, and an arm 67 is present between the first wrist joint 58 and the second wrist joint 60. The lengths of the arms 64, 66 and 67 can vary. The robotic assembly 50 is mounted to a stationary object 204, such as a work bench, table, desk top, platform, pedestal, etc.

The stationary object 204 can vary in size, shape, configuration, design and material from which it is constructed. The stationary object 204 can be secured to a floor, wall, ceiling, a vertical surface, an inclined surface, or some other structure. Alternatively, the stationary object 204 could be a pedestal which in turn is secured to a horizontal or vertical surface. Another option is to secure the robotic assembly 50 to a movable carriage which in turn can move along a stationary member, such as an I-beam. The I-beam can be linear or non-linear, The I-beam could be configured to form a circle, an oval, an ellipse, etc. of various size. The movable carriage can then transport the robotic assembly 50 to various work stations.

It should be understood that the stationary object 204 can be permanently secured to something or be free standing. The stationary object 204 could be placed in a movable vehicle or vessel such as: in a truck, in a semi-trailer, on a boat, in an airplane, in a submarine, in a rocket ship, etc. This would be advantageous for installing components on or in the water, in space, etc.

The stationary object 204 can have an upper surface 206, such as a planar surface, to which the base joint 52 is secured. Alternatively, the base joint 52 could be secured to any part of the stationary object 204. The base joint 52 can be secured using any kind or type of fasteners known to those skilled in the art. For example, such fasteners can include but are not limited to: mechanical fasteners, such as bolts, washers, nuts, screws, studs, nails, clamps, brackets, welds, etc., as well as chemical fasteners, such as an adhesive, a co-adhesive or glue. Desirably, a mechanical fastener will include two or more bolts which pass through holes drilled or formed through the upper surface 206 of the stationary object 204. Washers and nuts can be used to secure the bolts to the stationary object 204.

When the robotic assembly 50 is mounted to the stationary object 204, the second wrist joint 60 or the last joint will be capable of being spaced farthest away from the stationary object 204 or from the upper surface 206. Similar to the robotic assembly 50 explained above, each of the joints 52, 54, 56, 58 and 60 has 360° of rotational motion.

An effector 68 is attached to the second wrist joint 60 or to the last joint. The effector 68 has a first surface 70 and an oppositely aligned second surface 72. The first surface 70 is removable secured to the second wrist joint 60. The effector 68 also has a first side 74, a second side 76, a third side 78 and a fourth side 80 (see FIG. 3). The first side 74 is perpendicularly aligned to the second side 76. One or more suction cups 90 are mounted on the second surface 72 of the effector 68. Two suction cups 90, 90 are depicted in FIG. 15. Each of the suction cups 90, 90 is connected to a vacuum source 92, see FIG. 3. Each of the suction cups 90, 90 is capable to picking up, positioning and releasing a new item 104 relative to a first laid item 96 and a second laid item 100. In FIG. 15, the two suction cups 90, 90 work in unison to lift and place a new item 104. The new item 104 could be any known item. For example, the new item 104 can include but is not limited to: a tile, a metal plate, a computer chip, an electrical wire, a component, a subassembly, a panel, a switch, a device, a tag, etc. The new item 104 can vary in size and geometrical shape. The new item 104 could be square, rectangular, triangular, round, oval or have an irregular geometry.

The first and second laid items, 96 and 100 respectively, each has an upper surface 98 and 102 respectively, and each is aligned perpendicular to one another.

The machine 10' also includes a first edge sensor 108, a second edge sensor 110 and a third edge sensor 112, see FIGS. 3 and 7. At least one of the three edge sensors, 108, 110 and 112 is secured to the first side 74 of the effector 68 and is capable of detecting an edge aligned along an X-X axis of the first laid item 96, and at least one of the three edge sensors, 108, 110 and 112 is secured to the second side 76 of the effector 68 and is capable of detecting an edge aligned along a Y-Y axis of the second laid item 100.

The machine 10' further includes a first height sensor 114, a second height sensor 116 and a third height sensor 118, see FIGS. 3 and 7. At least one of the three height sensors, 114, 116 and 118 is secured to the first side 74 of the effector 68 and is capable of detecting the height of the upper surface 98 of the first laid item 96, and at least one of the three height sensors, 114, 116 and 118 is secured to the second side 76 of the effector 68 and is capable of detecting the height of the upper surface 102 of the second laid item 100. The machine 10' also includes a control mechanism 120 for operating the robotic assembly 50, the vacuum source 92 and the edge and height sensors, 108, 110 and 112, and 114, 116 and 118 respectively. Lastly, the machine 10' includes a power source 126 for supplying power to the control mechanism 120.

It should be understood that for certain applications, the height sensors 114, 116 and 118 may not be needed. For example, when the measurements of a new item 104 are known and the new items 104 are to be grouped or arranged on the upper surface 206 of the stationary object 204, a computer could be used to calculate the height of each new item 104.

Still referring to FIG. 15, a pallet 208 is positioned adjacent to the stationary object 204. The pallet 208 can be moved using a fork lift truck or some other device (not shown). The pallet 208 can hold a quantity of the new items 104. The pallet 208 can vary in size, shape, design and construction. The pallet 208 can be formed from various materials, such as wood, plastic, metal, etc. The pallet 208 should be situated within reach of the robotic assembly 50. In other words, the effector 68 has to be able be positioned over and be able to pick up each of the new items 104 stacked on the pallet 208.

In place of the pallet 208, one could position a conveyor or a conveyor belt (not shown) adjacent to the stationary object 204. The conveyor or conveyor belt would function to convey new items 104 adjacent to the stationary object 204 so that the robotic assembly 50 could pick them up and place them on the upper surface 206.

On the upper surface 206 of the stationary object 204, one will notice two frames 210 and 210'. The frame 210 includes a peripheral structure with no bottom or top member. The other frame 210' has a bottom member 212 with an interior surface 214 onto which a bonding material 216 can be applied. Either frame 210 or 210' can be used depending on the task being performed. Both of the frames 210 and 210' could be identical in construction if so desired.

It should be understood that the frame 210 could be a jig or a cage like assembly. The bonding material 216 can vary. For example, the bonding material 216 can include but is not limited to: cement, grout, tile cement, a sealant, glue, an adhesive, a co-adhesive, a rubber cement or any other kind of bonding material known to those skilled in the art.

Still referring to FIG. 15, the frame 210' has a bottom surface 212 with an interior surface 214 onto which the bonding material 216 has been adhered. The new items 104 can be laid, placed or be positioned onto the bonding material 216 by the robotic assembly 50. The bonding material 216 will secure the new items 104 to the bottom member 212. The frame 210' will cooperate to keep the new items 104 within the periphery of the frame 210'. The frame 210' has an outer periphery 218 with an open upper surface 220. In this example, the frame 210' will become a part of the finished assembly and the integral unit can be shipped to the job site.

Contrary to the frame 210', the frame 210 is open on the bottom and top, such that only a outer periphery 218 is present. In this case, the new items 104 can be laid, placed or positioned into the frame 210 to form a visually distinct pattern. After the pattern is formed, the frame 210 can be removed and be reused.

Still referring to FIG. 15, the machine 10' can also includes an operator control panel 222, such as a computer screen, touch pad, etc. which is electronically connected to the control mechanism 120. The operator control panel 222 can be set up to override the control mechanism 120, if necessary.

Figure 16:
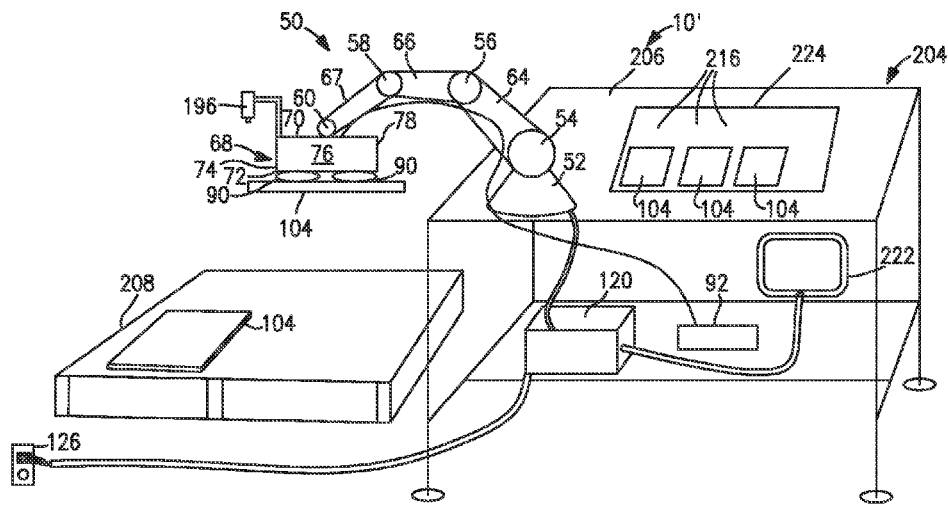
FIG. 16 is a schematic of the machine secured to a stationary object such as a work bench or table wherein items are installed on a board.

Referring now to FIG. 16, a board 224 is depicted. The board 224 can vary in size, shape and configuration. For example, the board 224 could be 4 feet by 8 feet with a thickness ranging from 0.1 inches to 2.0 inches. The board 224 can be constructed out of various materials including but not limited to: wood, metal, aluminum, plastic, steel, a composite, fiberglass, film, etc. The robotic assembly 50 can transfer the new items 104 from the pallet, conveyor or conveyor belt onto the board 224. A bonding material 216 can be positioned on the board so as to secure the new items 104 in place. When the board 224 is filled with the new items 104, the board 224 and the secured new items 104 are shipped to the job site. For example, a tiled board could be used to line the inside surface of a tunnel in an airport, the inside of a train station, the inside of a furnace, the outside of rocket, etc.

Referring now to FIG. 17, three robotic assemblies 50, 50 and 50 are shown. One has its base joint 52 mounted and secured to a floor 226. A second has its base joint 52 mounted and secured to a vertical wall 228. The third has its base joint 52 mounted and secured to a horizontal ceiling 230. It should be understood that the base joint 52 of a robotic assembly 50 can be mounted and secured to various stationary objects 204 in different positions.

Referring now to FIG. 18, the base joint 52 of a robotic assembly 50 is shown mounted and secured to a pedestal 232. The pedestal 232 has a base 234 and an upper surface 236. The base can be secured to a floor or some other surface. The base joint 52 can be secured to the upper surface 236 of the pedestal 232. The pedestal 232 raises up the robotic assembly 50 so that it can secure a new item 104 to a larger work piece.

Referring now to FIG. 19, a platform 238 is shown. The platform 238 can vary in size, shape, configuration and material from which it is constructed. The platform 238 is depicted as an L-shaped member. The robotic assembly 50, the control mechanism 120 and the operator control panel 222 are permanently mounted to the platform 238. A power source 126 supplies power to all the components. The platform 238 includes a plurality of eye bolts 240. By "eyebolt" it is meant a bolt having a looped head designed to receive a hook or rope. Four spaced apart eye bolts 240, 240, 240 and 240 are shown in FIG. 19. Each of the four eye bolts 240, 240, 240 and 240 is shown being secured to a corner of the platform 238. However, each of the four eye bolts 240, 240, 240 and 240 could be secured along a side of the platform 238, if desired. The four eye bolts 240, 240, 240 and 240 function to provide a means for lifting, and moving the platform 238 to various sites without the need to separately move the robotic assembly 50, the control mechanism 120 and the operator control panel 222. One just unplugs the power cord from the power source 126, and the platform 238 can be moved. A mechanical, hydraulic or pneumatic lift, crane, overhead crane, a forklift truck or some other motorized mechanism can be used to move the platform 238. Alternatively, the platform 238 can be moved manually, if it is not to heavy.

It should be understood that one could substitute some other kinds or types of fasteners for the four eye bolts 240, 240, 240 and 240, if desired, Likewise, the eye bolts 240, 240, 240 and 240 could be mounted to various parts of the platform 238, if desired.

The platform 238 has a generally planar surface 242 onto which one or more new items 104 can be grouped or assembled. The planar surface 242 is similar to the upper surface 206 on the work bench, desk top, table, etc, shown in FIG. 15.

Referring now to FIG. 20, the robotic assembly 50 is shown with the base joint 52 mounted on and secured to a movable carriage 244. The movable carriage 244 is designed to move along a linear I-beam 246. The movable carriage 244 can contain one or more wheels or rollers 248. Two sets of wheels 248, 248 are located on each side of the I-beam 246. Only one of the two sets of wheels 248, 248 is visible in FIG. 20. The movable carriage 244 can be remotely controlled or can be controlled by an attached power cord (not shown). The I-beam 246 can be mounted in various ways known to those skilled in the art. For example, the I-beam 246 can be positioned above a work zone and hang horizontally from a ceiling or support structure. Alternatively, the I-beam 246 can be mounted on two or more supports 250, 250 which support the I-beam 246 a few feet above the floor. In another embodiment, the I-beam 246 can be cantilevered. The I-beam 246 can extend into or through a hollow cylindrical tube 252 so that new items (tiles) 104 can be secured to an interior surface 254 thereof. For example, certain cylinders need to be lined with tile 104 or other material to prevent corrosion, to handle extreme temperatures, to handle caustic chemicals, etc. The machine 10' facilitates securing the new items (tiles) 104 to the interior surface 254 of the hollow cylindrical tube 252 in an efficient and economical manner.

It is also possible to position a work piece, such as an elongated tubular, hollow or solid member on a rolling apparatus and position the I-beam 246 adjacent to the exterior surface of the work piece. The machine 10', with its robotic assembly 50, can then apply new items (tiles) 104 to the external surface of the work piece. The work piece can be slowly rotated such that new items (tiles) 104 can be secured in place to cover the entire periphery of the work piece, if required.

For some jobs, the I-beam 246 can be cantilevered into a work piece so that the robotic assembly 50 can perform its operation. By "cantilever" it is meant projecting beyond a fulcrum and being supported by a balancing member or a downward force behind the fulcrum.

Figure 21:
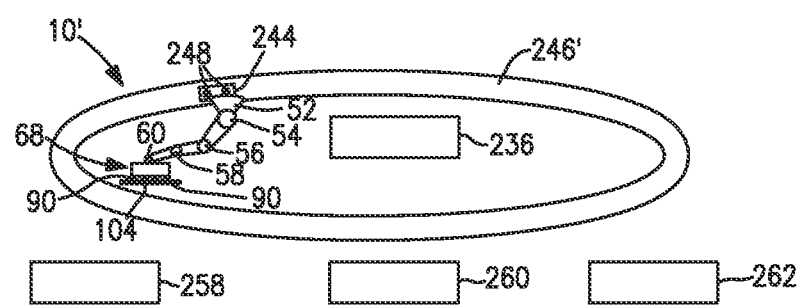
FIG. 21 is a schematic of the machine secured to a carriage which can move on a non-linear I-beam, arranged as a circle or oval, between multiple work stations.

Referring now to FIG. 21, another embodiment is shown wherein the machine 10' has the robotic assembly 50 secured to a movable carriage 244 which can move along a non-linear I-beam 246'. The non-linear I-beam 246' can have various configurations, including but not limited to: an arcuate shape, a zigzag shape, an angular shape, etc. The non-linear I-beam 246' can also be arranged as a circle, an oval, an ellipse, etc. The non-linear I-beam 246' can be hung from an overhead support, rafters, ceiling, etc. such that it is horizontally aligned with the floor. The non-linear I-beam 246' can be sized and configured to span across or between two or more work stations 256 and 258. Four work stations 256, 258, 260 and 262 are depicted in FIG. 21. The robotic assembly 50 can perform an identical operation at each work station 256, 258, 260 and 262 or can perform a different task at each of the work stations 256, 258, 260 and 262. For example, the robotic assembly 50 can move from one work station to the next but perform the exact same operation at each work station 256, 258, 260 and 262. Alternatively, the robotic assembly 50 can perform a different function at each of the four work stations 256, 258, 260 and 262.

Method

A method of using the machine 10 will be explained with reference to the FIGS. 1-14. The machine 10 can be mounted to a stationary object 204, such as a bench top, desk top, etc. or be secured to a movable platform 12 which is capable of moving along an X-X axis and a Y-Y axis. The stationary object 204 has an upper surface 206 onto which new items 104 can be assembled. The machine 10 also has a robotic assembly 50 with at least four spaced apart joints. The joints include a base joint 52, a shoulder joint 54, an elbow joint 56 and a wrist joint 58. The base joint 52 is connected to the movable platform 12 and the wrist joint 58 is capable of being spaced farthest away from the movable platform 12. Each of the joints 52, 54, 56 and 58 has 360° of rotational motion. The machine 10 also has an effector 68 having a first surface 70 and an oppositely aligned second surface 72. The first surface 70 is removably secured to the wrist joint 58. The effector 68 has a first side 74, a second side 76, a third side 78 and a fourth side 80. The first side 74 is perpendicularly aligned to the second side 76. A suction cup 90 is mounted on the second surface 72 of the effector 68. The suction cup 90 is connected to a vacuum source 92. The suction cup 90 is capable to picking up, positioning and releasing a new, to be installed, tile 104 relative to a first laid tile 96 and a second laid tile 100. Each of the first and second laid tiles, 96 and 100 respectively, has an upper surface 98, 102 and each is aligned perpendicular to one another. The machine 10 also has first, second and third edge sensors, 108, 110 and 122 respectively. At least one of the three edge sensors 108, 110 and 112 is secured to the first side 74 of the effector 68 and is capable of detecting an edge aligned along an X-X axis of the first laid tile 96, and at least one of the three edge sensors 108, 110 and 112 is secured to the second side 76 of the effector 68 and is capable of detecting an edge aligned along a Y-Y axis of the second laid tile 100. All three edge sensors 108, 110 and 112 are utilized sequentially or simultaneously.

The machine 10 further has first, second and third height sensors 114, 116 and 118. At least one of the three height sensors 114, 116 and 118 is secured to the first side 74 of the effector 68 and is capable of detecting the height of the upper surface 98 of the first laid item 96, and at least one of the three height sensors 114, 116 and 118 is secured to the second side 76 of the effector 68 and is capable of detecting the height of the upper surface 102 of the second laid item 100. All three height sensors 114, 116 and 118 are utilized sequentially or simultaneously. The machine 10 also has a control mechanism 120 for operating the robotic assembly 50, the vacuum source 92 and the three edge and three height sensors, 108, 110 and 112 and 114, 116 and 118 respectively. Lastly, the machine 10 has a power source 126 for supplying power to the robotic assembly 50, the vacuum source 92, the control mechanism 120 and the control touch pad 124.

A method includes the steps of applying a bonding material to the upper surface 206. Then a row is laid out perpendicular to a column. The row has a first laid item 96 and the column has a second laid item 100. The first laid item 96 is offset from the second laid item 100. The method also includes positioning the machine 10 such that the first side 74 of the effector 68 is located within a predetermined distance of the X-X axis of the first laid item 96 and the second side 76 of the effector 68 is located within a predetermined distance of the Y-Y axis of the second laid item 100. The predetermined distance can be about 2 inches or less.

The method further includes using the control mechanism 120 to move the robotic assembly 50 such that the suction cup 90 is positioned above a new, to be installed item 104 and activating the vacuum source 92 to lift the to be installed item 104 and move it into position adjacent to the X-X axis of the first laid item 96 and the Y-Y axis of the second laid item 100 using data generated by the first, second and third edge sensors, 108, 110 and 112 respectively, and by the first, second and third height sensors, 114, 116 and 118 respectively. The method further includes applying a pre-calculated force against the new to be installed item 104 to set it in the bonding material at the correct height relative to the first and second laid items, 96 and 100 respectively. The control mechanism 120 can be programmed to pick up additional new to be installed items 104 and set them one by one in a desired location.

The method can further include mounting a camera 196 on the effector 68 and using the camera 196 to take an image of a grain pattern 194 formed in the upper surface 192 of a first laid item 190', to take an image of a grain pattern 194 formed in the upper surface 192 of a second laid item 190", and to take an image of a grain pattern 194 formed in an upper surface 192 of the new, to be installed item 190 when the new to be installed item 190 is positioned relative to the X-X axis of the first laid item 190' and the Y-Y axis of the second laid item 190". The images are taken by the camera and are fed back to the control mechanism 120 and the computer 122 before the new, to be installed item 190 is released from the suction cup 90. The images of the three grain patterns 194, 194 and 194 are compared to ensure that the grain pattern 194 in the new to be installed item 190 is properly aligned relative to the grain patterns 194, 194 in the first and second laid items 190' and 190" respectively. Then a pre-calculated force is applied against the new to be installed item 190 to set it in the bonding material at the correct height relative to the first and second laid items, 96 and 100 respectively.

A second method of using the machine 10' for aligning items 104 in a pattern will be explained in relation to FIGS. 15-21. In this method, the robotic assembly 50 has at least four spaced apart joints. Five joints are depicted in FIGS. 15-21. The five joints include a base joint 52, a shoulder joint 54, an elbow joint 56, a first wrist joint 58 and a second wrist joint 60. If six joints are utilized, a third wrist joint 62 would be present. The base joint 52 is mounted to a stationary object 204 and the second wrist joint 60 is capable of being spaced farthest away from the stationary object 204. If only one wrist joint 58 is utilized, the first wrist joint 58 is capable of being spaced farthest away from the stationary object 204. The stationary object 204 has a planar upper surface 206 on which a frame 210 or 210' can be positioned. The planar surface 206 may be able to accommodate two or more frames 210 and/or 210'.

Each of the joints has 360° of rotational motion.

An effector 68, having a first surface 70 and an oppositely aligned second surface 72, is removably secured to the second wrist joint 60, or to the last wrist joint 58 or 62, via the first surface 70. The effector 68 also has a first side 74, a second side 76, a third side 78 and a fourth side 80. The first side 74 is perpendicularly aligned to the second side 76. One or more suction cup(s) 90, 90 can be mounted on the second surface 72 of the effector 68 and each is connected to a vacuum source 92. Two suction cups 90, 90 are shown in FIGS. 15-21. The suction cups 90, 90 are capable of picking up, positioning and releasing a "to be installed" item 104 relative to a first laid item 96 and a second laid item 100. Each of the first and second laid items, 96 and 100 respectively, has an upper surface 98 and 102 respectively. Each of the first and second laid items, 96 and 100 respectively, is aligned perpendicular to one another.

The machine 10' also includes first, second and third edge sensors 108, 110 and 112. At least one of the three edge sensors 108, 110 and 112 is secured to the first side 74 of the effector 68 and is capable of detecting an edge aligned along an X-X axis of the first laid item 96. At least one of the three edge sensors 108, 110 and 112 is secured to the second side 76 of the effector 68 and is capable of detecting an edge aligned along a Y-Y axis of the second laid item 100.

The machine 10' further includes first, second and third height sensors 114, 116 and 118. At least one of the three height sensors 114, 116 and 118 is secured to the first side 74 of the effector 68 and is capable of detecting the height of the upper surface 98 of the first laid item 96. At least one of the three height sensors 114, 116 and 118 is secured to the second side 76 of the effector 68 and is capable of detecting the height of the upper surface 102 of the second laid item 100. The machine 10' also includes a control mechanism 120 for operating the robotic assembly 50, the vacuum source 92 and the edge and height sensors and 108, 110 and 112, and 114, 116 and 118 respectively. Lastly, the machine 10' has a power source 126 for supplying power to the robotic assembly 50, the vacuum source 92, the control mechanism 120 and to the control panel 222.

This second method includes the steps of positioning a frame 210' having a bottom member 212 with an interior surface 214 on the planar surface 206 of the stationary object 204. A bonding material 216 is then applied to an interior surface 214 of the bottom member 212. A first item 96 is then manually laid on the bonding material 216 and a second item 100 is aligned perpendicular to the first item 96. The first laid item 96 is offset from the second laid item 100. The first side 74 of the effector 68 is then positioned within a predetermined distance of the X-X axis of the first laid item 96 and the second side 76 of the effector 68 is positioned within a predetermined distance of the Y-Y axis of the second laid item 100. The predetermined distance can be about 2 inches or less. The control mechanism 120 is then used to move the robotic assembly 50 such that a suction cup 90 is positioned above a "to be installed" item 104. The vacuum source 92 is activating to lift the item 104 and move it into position adjacent to the X-X axis of the first laid item 96 and adjacent to the Y-Y axis of the second laid item 100 using data generated by the first, second and third edge sensors 108, 110 and 112 and by the first, second and third height sensors 114, 116 and 118. The method also includes applying a pre-calculated force against the "to be installed" item 104 to set it in the bonding material 216 at the correct height relative to the first and second laid items, 96 and 100 respectively. Lastly, additional items 104 are sequentially picked up and positioned by the robotic assembly 50 within the frame 210'. By repeating such steps, the entire frame 210' can be filled with the new items 104.

This method can also include laying the items 104 into the frame 210'. The frame 210' has a bottom member 212 with an interior surface 214 onto which the bonding material 216 is applied. The frame 210' also has an outer periphery 218 and an open upper surface 220. After the items 104 become permanently attached to the bonding material 216, both the items 104 and the frame 210' can be shipped to a job site.

The method can also include inserting the items 104 into a frame 210, having no bottom and no top, to form a visually distinct pattern. After the pattern is complete, both the pattern and frame 210 can be shipped to the job site. It is also possible to use a board 224 instead of a frame 210 or 210'. The bonding material 216 can be applied to the upper surface of the board 224 and the new items 104 can be arranged on the board 224. After the bonding material 216 has dried or cured, the board 224, with the new items 104 secured thereto, can be shipped to a job site.

Lastly, it should be understood that one could mount a camera on the effector 68 and use the camera to take an image of a grain pattern formed in the upper surface 98 of the first laid item 96, to take an image of a grain pattern formed in the upper surface 102 of the second laid item 100, and to take an image of a grain pattern formed in an upper surface 106 of the "to be installed" item 104 when the item 104 is positioned relative to the X-X axis of the first laid item 96 and the Y-Y axis of the second laid item 100, but before the "to be installed" item 104 is released from the suction cups 90, 90. The images of the three grain patterns can be compared to ensure that the grain pattern in the "to be installed" item 104 is properly aligned relative to the grain patterns in the first and second laid items, 96 and 100 respectively.

It may also be possible to substitute a camera for each of the first, second and third edge sensors 108, 110 and 112, and/or for each of the first, second and third height sensors 114, 116 and 118 in certain applications.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A machine for aligning items in a pattern comprising:
 a) a robotic assembly having four spaced apart joints, said joints including a base joint, a shoulder joint, an elbow joint and a wrist joint, said base joint being mounted to a stationary object and said wrist joint capable of being spaced farthest away from said stationary object, and each of said joints having 360° of rotational motion;
 b) an effector having a first surface and an oppositely aligned second surface, said first surface being removable secured to said wrist joint, said effector having a first side, a second side, a third side and a fourth side, and said first side is perpendicularly aligned to said second side;
 c) a suction cup mounted on said second surface of said effector which is connected to a vacuum source, said suction cup capable to picking up, positioning and releasing a new item relative to a first laid item and a second laid item, said first and second laid items each having an upper surface and each being aligned perpendicular to one another;
 d) first, second and third edge sensors, at least one of said three edge sensors secured to said first side of said effector and capable of detecting an edge aligned along an X-X axis of said first laid item, and at least one of said three edge sensors secured to said second side of said effector and capable of detecting an edge aligned along a Y-Y axis of said second laid item;
 e) first, second and third height sensors, at least one of said three height sensors secured to said first side of said effector and capable of detecting the height of said upper surface of said first laid item, and at least one of said three height sensors secured to said second side of said effector and capable of detecting the height of said upper surface of said second laid item;
 f) a control mechanism for operating said robotic assembly, said vacuum source and said edge and height sensors; and
 g) a power source for supplying power to said control mechanism.

2. The machine of claim 1 wherein said base joint is mounted to a work bench.

3. The machine of claim 1 wherein said base joint is mounted to a table.

4. The machine of claim 1 wherein said base joint is mounted on a pedestal which in turn is secured to a horizontal surface.

5. The machine of claim 1 wherein said base joint is mounted to a vertical surface.

6. The machine of claim 1 wherein said base joint is mounted to a ceiling.

7. The machine of claim 1 wherein said base joint is mounted to a movable carriage.

8. The machine of claim 7 wherein said movable carriage can move along a stationary member.

9. The machine of claim 8 wherein said stationary member is an I-beam.

10. A machine for aligning items in a pattern comprising:
 a) a robotic assembly having at least five spaced apart joints, said joints including a base joint, a shoulder joint, an elbow joint, a first wrist joint and a second wrist joint, said base joint being mounted to a stationary object and said second wrist joint capable of being spaced farthest away from said stationary object, and each of said joints having 360° of rotational motion;
 b) an effector having a first surface and an oppositely aligned second surface, said first surface being removable secured to said second wrist joint, said effector having a first side, a second side, a third side and a fourth side, and said first side is perpendicularly aligned to said second side;
 c) at least one suction cup mounted on said second surface of said effector, said suction cup being connected to a vacuum source, said suction cup capable to picking up, positioning and releasing a new item relative to an X-X axis of a first laid item and a Y-Y axis of a second laid item, and each of said first and second laid items having an upper surface and each being aligned perpendicular to one another;
 d) first, second and third edge sensors, at least one of said three edge sensors secured to said first side of said effector and capable of detecting an edge aligned along an X-X axis of said first laid item, and at least one of said three edge sensors secured to said second side of said effector and capable of detecting an edge aligned along a Y-Y axis of said second laid item;
 e) first, second and third height sensors, at least one of said three height sensors secured to said first side of said effector and capable of detecting the height of said upper surface of said first laid item, and at least one of said three height sensors secured to said second side of said effector and capable of detecting the height of said upper surface of said second laid item;
 f) a control mechanism for operating said robotic assembly, said vacuum source and said edge and height sensors; and
 g) a power source for supplying power to said control mechanism.

11. The machine of claim 10 wherein said control mechanism is activated by a computer having a software program loaded therein, and a movable pallet is positioned adjacent to said base joint, said movable pallet supporting a plurality of to be installed items which can be individually picked up, positioned and released by said suction cup.

12. The machine of claim 10 wherein said suction cup is capable of picking up, positioning and releasing an item sequentially and applying a downward force of from between about 10 Nm to about 150 Nm to set said to be installed item against a bonding material.

13. The machine of claim 10 wherein said base joint is mounted to a movable carriage which can move along an I-beam.

14. The machine of claim 13 wherein said I-beam has a non-linear shape.

15. The machine of claim 13 wherein said I-beam has a linear shape.

16. A method of using a machine for aligning items in a pattern having a robotic assembly having four spaced apart joints, said joints including a base joint, a shoulder joint, an elbow joint and a wrist joint, said base joint being mounted to a stationary object and said wrist joint capable of being spaced farthest away from said stationary object, said stationary object having a planar surface on which a frame can be positioned, and each of said joints having 360° of rotational motion; an effector having a first surface and an oppositely aligned second surface, said first surface being removably secured to said wrist joint, said effector having a first side, a second side, a third side and a fourth side, and said first side is perpendicularly aligned to said second side; a suction cup mounted on said second surface of said effector which is connected to a vacuum source, said suction cup capable to picking up, positioning and releasing a to be installed item relative to a first laid item and a second laid item, each of said first and second laid items having an upper surface and each being aligned perpendicular to one another; first, second and third edge sensors, at least one of said three edge sensors is secured to said first side of said effector and is capable of detecting an edge aligned along an X-X axis of said first laid item, and at least one of said three edge sensors is secured to said second side of said effector and is capable of detecting an edge aligned along a Y-Y axis of said second laid item; first, second and third height sensors, at least one of said three height sensors is secured to said first side of said effector and is capable of detecting the height of said upper surface of said first laid item, and at least one of said three height sensors is secured to said second side of said effector and is capable of detecting the height of said upper surface of said second laid item; a control mechanism for operating said robotic assembly, said vacuum source and said edge and height sensors; and a power source for supplying power to said control mechanism, said method comprising the steps of:

a) positioning a frame on said planar surface of said stationary object, said frame having a bottom member with an interior surface to which a bonding material is applied;

b) manually laying a first item on said bonding material and a second item perpendicular to said first item, and said first laid item being offset from said second laid item;

c) positioning said first side of said effector within a predetermined distance of said X-X axis of said first laid item and said second side of said effector within a predetermined distance of said Y-Y axis of said second laid item;

d) using said control mechanism to move said robotic assembly such that said suction cup is positioned above a to be installed item and activating said vacuum source to lift said item and move it into position adjacent said X-X axis of said first laid item and said Y-Y axis of said second laid item using data generated by said first, second and third edge sensors and by said first, second and third height sensors;

e) applying a pre-calculated force against said to be installed item to set it in said bonding material at an appropriate height relative to said first and second laid items; and f) repeating steps d and e to lay additional items.

17. The method of claim 16 wherein said predetermined distance is about 2 inches or less.

18. The method of claim 16 wherein after said items become permanently attached to said bonding material, said frame and items are both shipped to a job site.

19. The method of claim 16 further comprising positioning a board on said planar surface of said stationary object, said board having an upper surface to which a bonding material is applied, manually laying a first item on said bonding material and a second item perpendicular to said first item, and said first laid item being offset from said second laid item, positioning said first side of said effector within a predetermined distance of said X-X axis of said first laid item and said second side of said effector within a predetermined distance of said Y-Y axis of said second laid item, using said control mechanism to move said robotic assembly such that said suction cup is positioned above a to be installed item and activating said vacuum source to lift said item and move it into position adjacent said X-X axis of said first laid item and said Y-Y axis of said second laid item using data generated by said first, second and third edge sensors and by said first, second and third height sensors, and applying a pre-calculated force against said to be installed item to set it in said bonding material at an appropriate height relative to said first and second laid items.

20. The method of claim 16 further comprising mounting a camera on said effector and using said camera to take an image of a grain pattern formed in said upper surface of said first laid item, to take an image of a grain pattern formed in said upper surface of said second laid item, and to take an image of a grain pattern formed in an upper surface of said to be installed item when said item is positioned relative to said X-X axis of said first laid item and said Y-Y axis of said second laid item, but before said to be installed item is released from said suction cups, said images of said three grain patterns are compared to ensure that said grain pattern in said to be installed item is properly aligned relative to said grain patterns in said first and second laid items.

\* \* \* \* \*